US012469120B2

(12) United States Patent
Grube

(10) Patent No.: US 12,469,120 B2
(45) Date of Patent: Nov. 11, 2025

(54) SYSTEMS AND METHODS FOR REGISTERING DATA TO A COORDINATE SYSTEM

(71) Applicant: The Boeing Company, Chicago, IL (US)

(72) Inventor: Robert W. Grube, Edmonds, WA (US)

(73) Assignee: The Boeing Company, Arlington, VA (US)

( * ) Notice: Subject to any disclaimer, the term of this patent is extended or adjusted under 35 U.S.C. 154(b) by 421 days.

(21) Appl. No.: 17/986,454

(22) Filed: Nov. 14, 2022

(65) Prior Publication Data
US 2024/0161261 A1 May 16, 2024

(51) Int. Cl.
G06T 7/00 (2017.01)
G06T 15/08 (2011.01)

(52) U.S. Cl.
CPC ............ G06T 7/0004 (2013.01); G06T 15/08 (2013.01); G06T 2207/10028 (2013.01); G06T 2207/10081 (2013.01)

(58) Field of Classification Search
None
See application file for complete search history.

(56) References Cited

U.S. PATENT DOCUMENTS

| 6,701,006 | B2 | 3/2004 | Moore et al. | |
|---|---|---|---|---|
| 10,066,925 | B2 | 9/2018 | Kurtz et al. | |
| 2017/0219336 | A1* | 8/2017 | Kurtz | G01B 11/0616 |
| 2020/0027693 | A1* | 1/2020 | Fang | H01L 22/12 |
| 2020/0043186 | A1* | 2/2020 | Selviah | G06T 7/33 |
| 2022/0044491 | A1* | 2/2022 | Lin | G06T 19/20 |
| 2022/0142714 | A1* | 5/2022 | Soper | A61B 5/066 |
| 2023/0150124 | A1* | 5/2023 | Swaminathan | B25J 9/1679 |
| | | | | 700/245 |

(Continued)

FOREIGN PATENT DOCUMENTS

EP 3 404 612 11/2018
WO WO 2022/025869 2/2022

OTHER PUBLICATIONS

Jovančević et al., "3D Point Cloud Analysis for Detection and Characterization of Defects on Airplane Exterior Surface", DOI: https:// doi.org/10.1007/s10921-017-0453-1 (Year: 2017).*

(Continued)

Primary Examiner — Chan S Park
Assistant Examiner — Promotto Tajrian Islam
(74) Attorney, Agent, or Firm — Walters & Wasylyna LLC

(57) ABSTRACT

A method includes steps of: (1) obtaining a metrology data set and a build data set representing an article; (2) determining a surface geometry of the article in the metrology data set and the build data set; (4) selecting a metrology data subset from the metrology data set representing the surface geometry; (5) selecting a build data subset from the build data set representing the surface geometry; (6) generating a metrology point cloud in a metrology coordinate system; (7) generating a build point cloud in a build coordinate system; (8) registering the metrology point cloud and the build point cloud; (9) calculating a transform between the metrology coordinate system and the build coordinate system; and (10) applying the transform to the metrology data set to convert the metrology data set to the build coordinate system.

20 Claims, 12 Drawing Sheets

(56) References Cited

U.S. PATENT DOCUMENTS

2023/0278225 A1* 9/2023 LePage ............ G05B 19/41875
  700/254
2023/0390021 A1* 12/2023 Polchin ..................... G06T 7/85

OTHER PUBLICATIONS

Shekhar et al., "High-Speed Registration of Three- and Four-dimensional Medical Images by Using Voxel Similarity," *RadioGraphics*, vol. 23, No. 6 (2003).
Elastix: a toolbox for rigid and nonrigid registration of images (see https://elastix.lumc.nl/).
Dream.3D Software (http://dream3d.bluequartz.net/).
European Patent Office, Extended European Search Report, App. No. 23207676.0 (Apr. 8, 2024).

* cited by examiner

SYSTEMS AND METHODS FOR REGISTERING DATA TO A COORDINATE SYSTEM

FIELD

The present disclosure relates generally to data processing and, more particularly, to systems and methods for registering data to a coordinate system or between different coordinate systems.

BACKGROUND

During design, manufacture, and inspection, an article may be represented by various different types of data. Typically, each different type of data has its own native coordinate system. As such, one type of data representing the article in one coordinate system may not be easily compared to another type data representing the article in another coordinate system. It certain circumstances, it may be desirable to determine a location of a portion of the article represented by a data set in a coordinate system that is not native to the data set. Accordingly, those skilled in the art continue with research and development efforts in the field of data processing.

SUMMARY

Disclosed are examples of a computer-implemented method for registering data to a coordinate system, a system for registering data to a coordinate system, and a computer program product for registering data to a coordinate system. The following is a non-exhaustive list of examples, which may or may not be claimed, of the subject matter according to the present disclosure.

In an example, the disclosed method includes steps of: (1) obtaining a metrology data set that represents an article in a metrology coordinate system; (2) obtaining a build data set that represents the article in a build coordinate system; (3) determining a surface geometry of the article that is present in the metrology data set and the build data set; (4) selecting a metrology data subset from the metrology data set that represents the surface geometry of the article; (5) selecting a build data subset from the build data set that represents the surface geometry of the article; (6) generating a metrology point cloud from the metrology data subset in the metrology coordinate system; (7) generating a build point cloud from the build data subset in the build coordinate system; (8) pre-aligning the metrology point cloud and the build point cloud; (9) registering the metrology point cloud and the build point cloud; (10) calculating a transform between the metrology coordinate system and the build coordinate system; and (11) applying the transform to the metrology data set to convert the metrology data set to the build coordinate system.

In an example, the disclosed system includes a computer including a processor programmed with instructions that, when executed by the processor, causes the computer to: (1) obtain a metrology data set that represents an article in a metrology coordinate system; (2) obtain a build data set that represents the article in a build coordinate system; (3) determine a surface geometry of the article that is present in the metrology data set and the build data set; (4) select a metrology data subset from the metrology data set that represents the surface geometry of the article; (5) select a build data subset from the build data set that represents the surface geometry of the article; (6) generate a metrology point cloud from the metrology data subset in the metrology coordinate system; (7) generate a build point cloud from the build data subset in the build coordinate system; (8) pre-align the metrology point cloud and the build point cloud; (9) register the metrology point cloud and the build point cloud; (10) calculate a transform between the metrology coordinate system and the build coordinate system; and (11) apply the transform to the metrology data set to convert the metrology data set to the build coordinate system.

In an example, the disclosed computer program product includes a non-transitory computer-readable medium storing program code that, when executed by a computer, causes the computer to perform operations including: (1) obtaining a metrology data set that represents an article in a metrology coordinate system; (2) obtaining a build data set that represents the article in a build coordinate system; (3) determining a surface geometry of the article that is present in the metrology data set and the build data set; (4) selecting a metrology data subset from the metrology data set that represents the surface geometry of the article; (5) selecting a build data subset from the build data set that represents the surface geometry of the article; (6) generating a metrology point cloud from the metrology data subset in the metrology coordinate system; (7) generating a build point cloud from the build data subset in the build coordinate system; (8) pre-aligning the metrology point cloud and the build point cloud; (9) registering the metrology point cloud and the build point cloud; (10) calculating a transform between the metrology coordinate system and the build coordinate system; and (11) applying the transform to the metrology data set to convert the metrology data set to the build coordinate system.

Other examples of the disclosed system, method, and computer program product will become apparent from the following detailed description, the accompanying drawings, and the appended claims.

DETAILED DESCRIPTION

The present disclosure recognizes that different types of three-dimensional data, such as computer-aided design data, metrology data, and the like, have their own native coordinate system. The present disclosure also recognizes that one type of data representing an article in its native coordinate system may not be easily aligned and/or compared to another type data representing the same article in its native coordinate system. The present disclosure further recognizes that it may be desirable to determine a location of a portion of the article represented by a data set in a coordinate system that is not native to that data set. Accordingly, the systems and methods disclosed herein enable data to be registered to a non-native coordinate system or transformed between different coordinate systems. Accordingly, the systems and methods disclosed herein may provide particular utility in manufacturing, such as additive manufacturing, non-destructive inspection, and defect detection.

Referring to FIGS. 1-8, by way of examples, the present disclosure is directed to systems and methods for registering data to a coordinate system or transforming data between different coordinate systems. In one or more examples, the systems and methods disclosed herein are computer implemented and utilize an interactive computer program product (e.g., software) that enables a first data set (e.g., a metrology data set) to be build and registered to a coordinate system of a second data set (e.g., a design data set) that is different than the first data set. Specific surface features or geometries of an article, represented by the first and second data sets, are isolated for an iterated closest point algorithm that aligns the first data set to the second data set. Generally, the output of the process is an alignment transform (e.g., rotation, translation, and/or scalar) and a cropped dataset representing at least the surface features or geometries of an article.

Figure 1A:
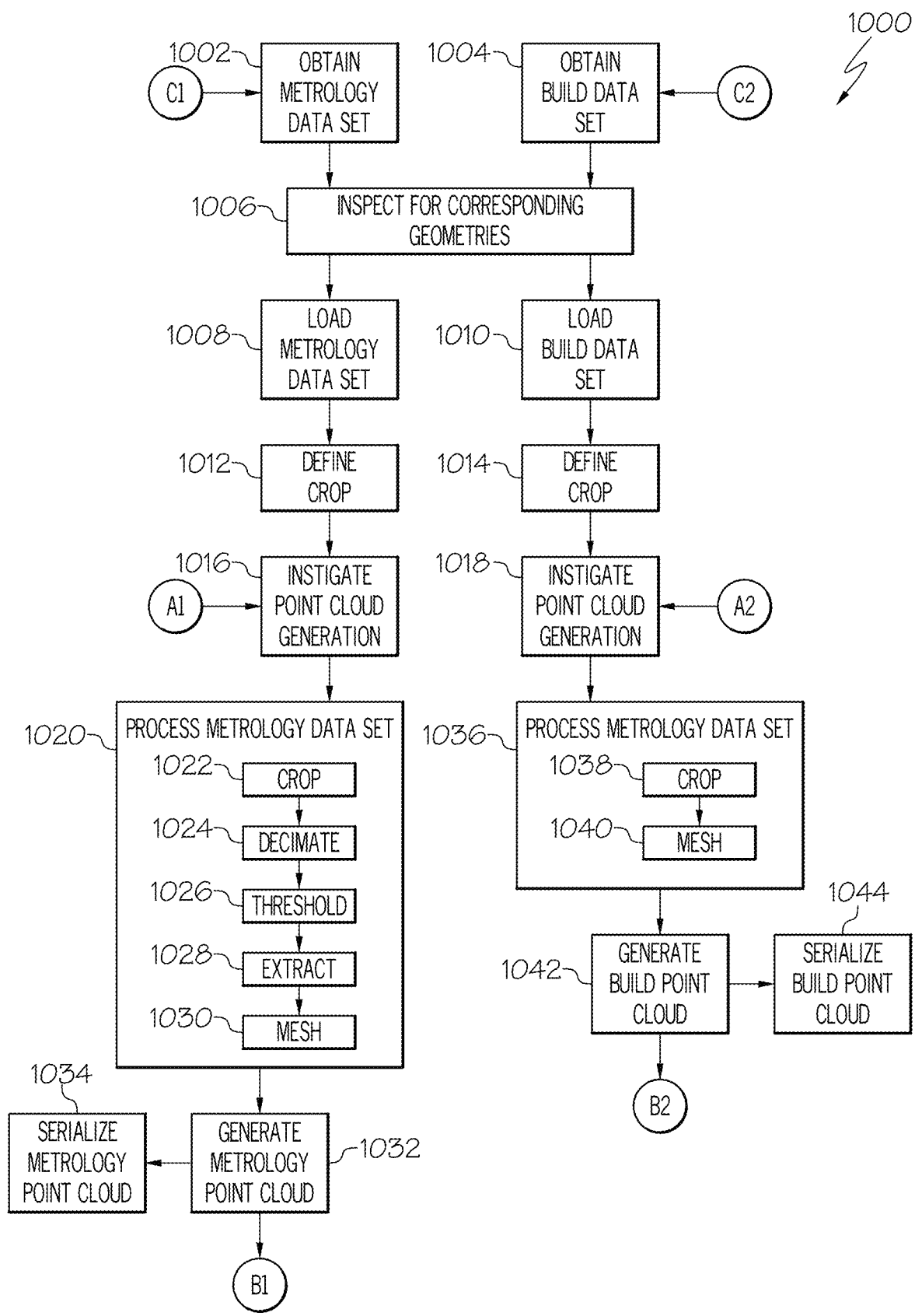
FIG. 1 (FIGS. 1A-1C) is a flow diagram of an example of a method for registering data to a coordinate system.
Figure 1B:
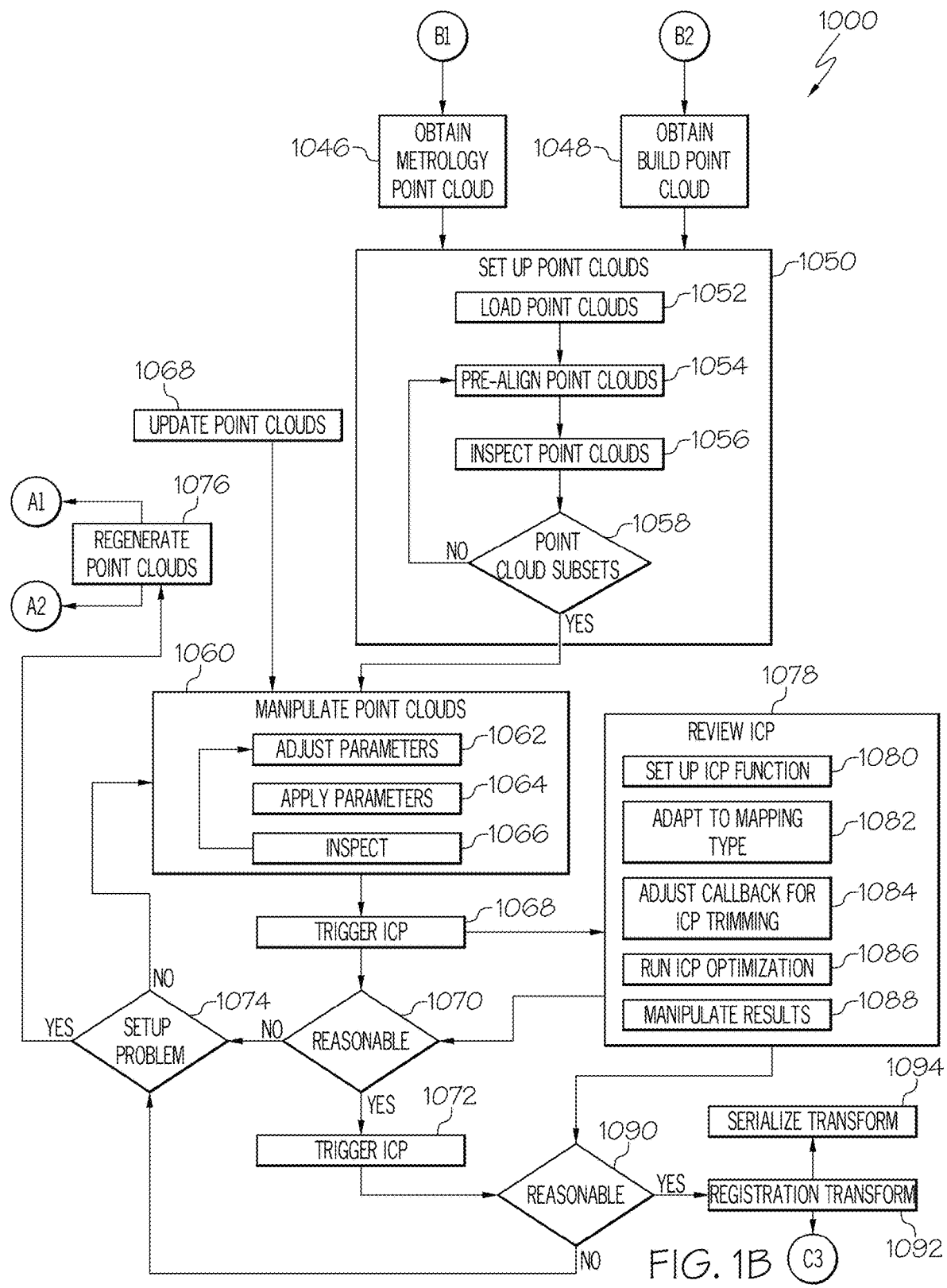
Figure 1C:
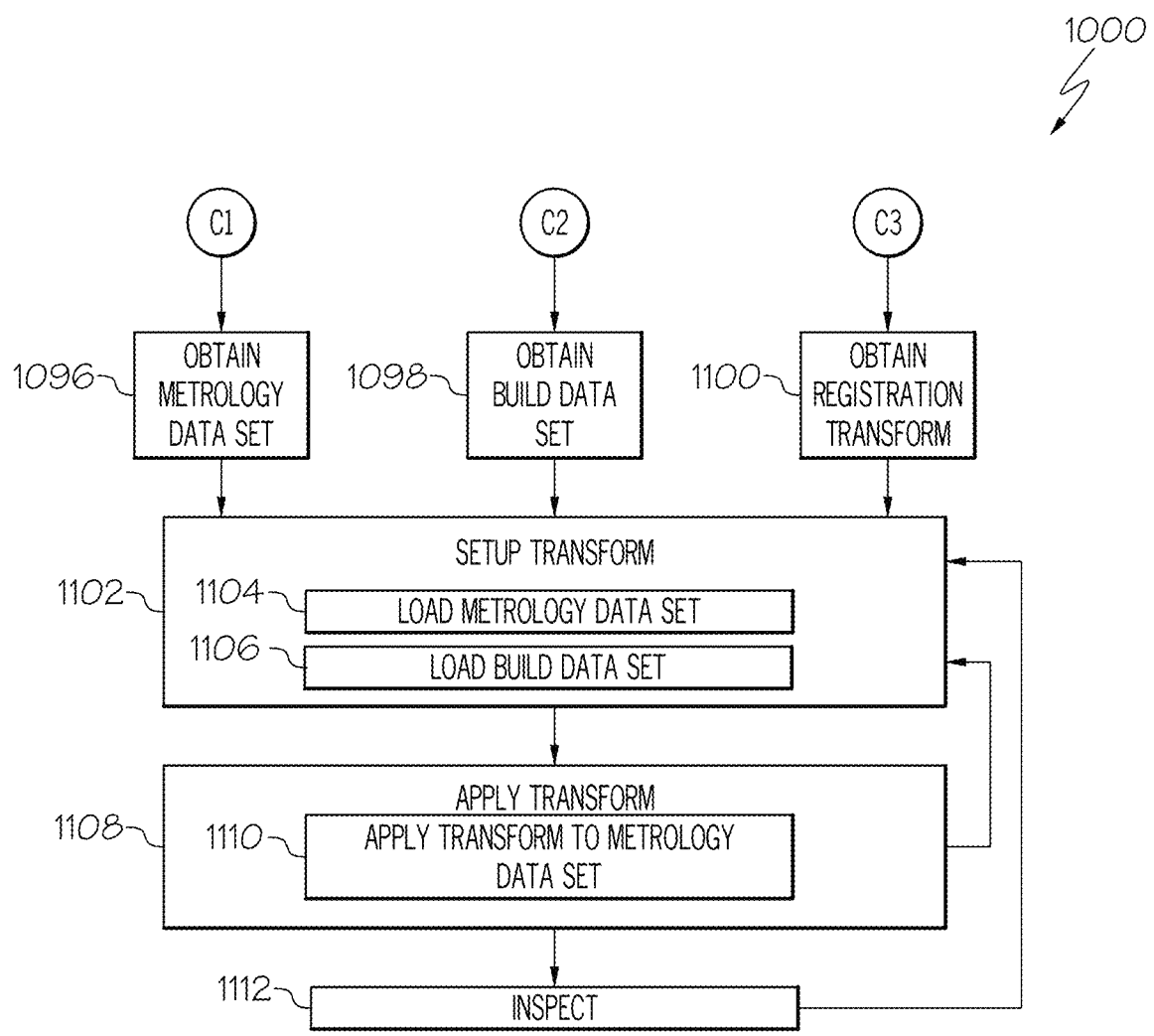

Referring to FIGS. 1A-1C, also referred to collectively herein as FIG. 1, which illustrates an example of a method 1000 for registering data to a coordinate system. In one or more examples, the method 1000 can be separated into three phases, processes, or sets of operations. In the illustrative example, the method 1000 includes a first set of operations directed to processing inputs and setting up an iterative closest point (ICP) process (shown in FIG. 1A), a second set of operations directed to performing the ICP process (shown in FIG. 1B), and a third set of operations directed to inspecting the results of the ICP process and applying a registration transform.

Figure 2:
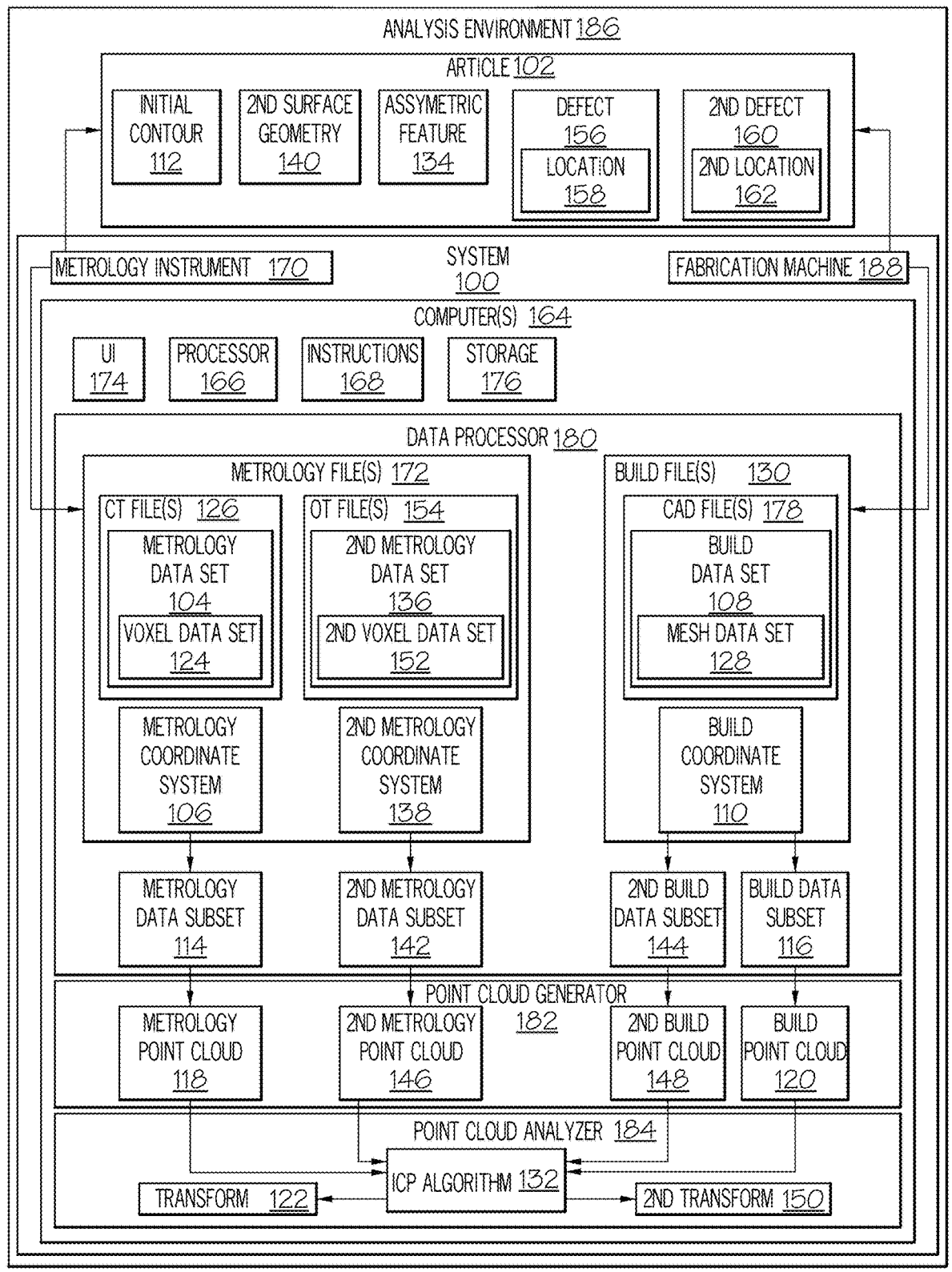
FIG. 2 is a schematic block diagram of an example of a system for registering data to a coordinate system.

In one or more examples, the method 1000 is at least partially implemented using a computer system, such as one or more computers 164 (FIG. 2). Accordingly, in one or more examples, the method 1000 is a computer-implemented method.

Referring to FIG. 1A and to FIG. 2, in one or more examples, the method 1000 includes a step of (block 1002) obtaining a metrology data set 104. The metrology data set 104 includes any set of measurement data or information generated or otherwise collected for and representing an article 102. The metrology data set 104 can represent the three-dimensional (3D) geometry of the article 102, such as a surface geometry of the article 102 and/or an internal geometry of the article 102, material properties of the article 102, any other measurable parameter of the article 102, and the like. The metrology data set 104 can be obtained from one or more metrology files 172. In one or more examples, the metrology files 172 include one or more computed tomography (CT) files 126 (e.g., a CT scan file) and the metrology data set 104 includes a voxel data set 124. In one or more examples, the metrology files 172 include one or more optical thermography (OT) files 154 and a second metrology data set 136 includes a second voxel data set 152. Any other suitable metrology data generated by any suitable metrology methodology is also contemplated and is within the scope of the method 1000 disclosed herein. The metrology data set 104 can be obtained directly from a corresponding metrology instrument 170. Alternatively, the metrology data set 104 can be obtained from computer storage 176.

Referring to FIG. 1A and to FIG. 2, in one or more examples, the method 1000 includes a step of (block 1004) obtaining a build data set 108. the build data set 108 includes any set of design data or information generated or otherwise collected for and representing the article 102. The build data set 108 can be obtained from one or more build files 130. In one or more examples, the build files 130 include one or more computer-aided design (CAD) files 178 and the build data set 108 includes a mesh data set 128. The build data set 108 can represent the three-dimensional (3D) geometry of the article 102, such as a surface geometry of the article 102 and/or an internal geometry of the article 102, and the like. Generally, the build data set 108 represents the design geometry of the article 102, such as used to fabricate the article 102. Any other suitable build or design data is also contemplated and is within the scope of the method 1000 disclosed herein. The build data set 108 can be obtained from computer storage 176.

Each data point of the metrology data set 104 is represented by a coordinate geometry that is native to the metrology data set 104. The coordinate geometry of the metrology data set 104 is referred to herein as a metrology coordinate system 106. Accordingly, each data point of the metrology data set 104 includes an XYZ-coordinate relative to an origin. Generally, the metrology coordinate system 106 is defined by the metrology instrument 170 used to inspect the article 102 (e.g., a CT scanner). Similarly, each data point of the build data set 108 is represented by a coordinate geometry that is native to the build data set 108. The coordinate geometry of the build data set 108 is referred to herein as a build coordinate system 110. Accordingly, each data point of the build data set 108 includes an XYZ-coordinate relative to an origin. Generally, the build coordinate system 110 is defined by the design model parameters or by the machine used to fabricate the article 102 (e.g., fabrication machine 188, such as an additive manufacturing machine). The build coordinate system 110 is different than the metrology coordinate system 106. As such, a data point representing a location on an exterior or an interior of the article 102 will have different coordinate values in the build coordinate system 110 and the metrology coordinate system 106.

Referring to FIG. 1A and to FIG. 2, in one or more examples, the method 1000 includes a step of (block 1006) inspecting for corresponding geometries. The corresponding geometries refer to at least a portion of a surface geometry 112 of the article 102 that is present or otherwise represented in both the metrology data set 104 and the build data set 108. In one or more examples, each one of the metrology data set 104 and the build data set 108 are examined for the corresponding geometries. The corresponding geometries (e.g., one or more surface geometries 112 that are present in both metrology data set 104 and the build data set 108) are used for point cloud alignment and data cropping, as will be described in greater detail herein below.

Referring to FIG. 1A and to FIG. 2, in one or more examples, the method 1000 includes a step of (block 1008) loading the metrology data set 104 and a step of (block 1010) loading the build data set 108 for further analysis and alignment using ICP. In one or more examples, the metrology data set 104 and the build data set 108 are loaded into the computer storage 176 of the computer 164 to be accessible by a processor 166.

Referring to FIG. 1A and FIG. 2, in one or more examples, the method 1000 includes a step of (block 1012) defining one or more crops for the metrology data set 104. The crop will result from a data cropping process that selects a subset of the metrology data set 104 by specifying one or more selection parameters, such as the surface geometry 112 found in both the metrology data set 104 and the build data set 108. In one or more examples, the crop results in or provides a chunk of metrology data (e.g., a chunk of voxels) that has or otherwise forms the corresponding geometry that was previously determined and found in the metrology data set 104 (e.g., block 1006). In one or more examples, the step of (block 1012) defining the crops results in or provides a metrology data subset 114, such as a voxel data subset, that represents the surface geometry 112 of the article 102 identified in the metrology data set 104 (e.g., block 1006). In one or more examples, the step of (block 1012) can be repeated a number of times to define one or more crops for disjoint chunks of metrology data.

In one or more examples, the method 1000 includes a step of (block 1014) defining one or more crops to be used for the build data set 108. The crop will result from a data cropping process that selects a subset of the build data set 108 by specifying one or more selection parameters, such as the surface geometry 112 found in both the metrology data set 104 and the build data set 108. In one or more examples, the crop results in or provides chunks of build data (e.g., mesh faces) that have or otherwise form the corresponding geometry that was previously determined and found in the build data set 108 (e.g., block 1006). In one or more examples, the step of (block 1014) defining the crops results in or provides a build data subset 116, such as a mesh data subset, that represents the surface geometry 112 of the article 102 identified in the build data set 108 (e.g., block 1006). In one or more examples, the step of (block 1014) can be repeated a number of times to define one or more crops for disjoint chunks of build data.

Referring to FIG. 1A, in one or more examples, the method 1000 includes a step of (block 1016) instigating point cloud generation for the subset or chunks of the metrology data set 104 (e.g., metrology data subset 114). The step of (block 1016) instigating provides resolution and sampling parameters for the crop or for defining the crop (e.g., block 1012).

In one or more examples, the method 1000 includes a step of (block 1018) instigating point cloud generation for the subset or chunks of the build data set 108 (e.g., build data subset 116). The step of (block 1016) instigating provides resolution and sampling parameters for the crop of for defining the crop (e.g., block 1014).

Referring to FIG. 1A and to FIG. 2, in one or more examples, the method 1000 includes a step of (block 1020) processing the metrology data set 104. Generally, the metrology data set 104 is processed to crop out and process one or more subsets of the metrology data set 104 (e.g., the metrology data subset 114) for use in generating a point cloud from the subset of data.

In one or more examples, the method 1000, such as the step of (block 1020) processing includes a step of (block 1022) cropping the metrology data set 104. The metrology data set 104 is cropped according to the previously defined crop (e.g., block 1012). For example, the metrology data subset 114 is cropped from the metrology data set 104 such that the metrology data subset 114 represents the surface geometry 112 of the article 102 previously identified and selected (e.g., block 1006).

In one or more examples, the method 1000, such as the step of (block 1020) processing includes a step of (block 1024) decimating at least a portion of the metrology data set 104, such as the metrology data subset 114. The metrology data set 104 is decimated to adjust, such as reduce, the resolution of the metrology data to a desired or appropriate resolution.

In one or more examples, the method 1000, such as the step of (block 1020) processing includes a step of (block 1026) thresholding at least a portion of the metrology data set 104, such as the metrology data subset 114. The metrology data set 104 is processed to threshold the metrology data (e.g., the voxels) into different classes based on intensity, image gradient, and the like. In one or more examples, thresholding of the metrology data set 104 is performed using Otsu's method. In one or more examples, thresholding of the metrology data set 104 is performed using gradient magnitude thresholding.

In one or more examples, the method 1000, such as the step of (block 1020) processing includes a step of (block 1028) extracting at least a portion of the metrology data set 104, such as the metrology data subset 114. In one or more examples, extracting the metrology data set 104 is performed using marching cubes, or other suitable computer graphics algorithm, that extracts a polygonal mesh of an isosurface from a three-dimensional discrete scalar field (the elements of which are sometimes called voxels).

In one or more examples, the method 1000, such as the step of (block 1020) processing includes a step of (block 1030) meshing at least a portion of the metrology data set 104, such as the metrology data subset 114. In one or more examples, meshing is an image-based meshing process for creating a computer model, such as a point cloud, from the metrology data subset 114.

In one or more examples, the method 1000 includes a step of (block 1032) generating a metrology point cloud 118. The metrology point cloud 118 is generated based on the processing steps performed on the metrology data set 104. In one or more examples, the metrology point cloud 118 is generated using the metrology data subset 114 and represents (e.g., is a three-dimensional representation of) the surface geometry 112 of the article 102 that was present in both the metrology data set 104 and the build data set 108 as previously identified and selected (e.g., block 1006). The metrology point cloud 118 is in the metrology coordinate system 106. As such, each data point of the metrology point cloud 118 has a XYZ-coordinate value in the metrology coordinate system 106.

In one or more examples, the method 1000 includes a step of (block 1034) serializing the metrology point cloud 118. Serializing the metrology point cloud 118 enables archiving, storage, and retrieval of the metrology point cloud 118 for purposes of reuse.

Referring to FIG. 1A and to FIG. 2, in one or more examples, the method 1000 includes a step of (block 1036) processing the build data set 108. Generally, the build data set 108 is processed to crop out and process one or more subsets of the build data set 108 (e.g., the build data subset 116) for use in generating a point cloud from the subset of data.

In one or more examples, the method 1000, such as the step of (block 1036) processing includes a step of (block 1038) cropping the build data set 108. The build data set 108 is cropped according to the previously defined crop (e.g., block 1014). For example, the build data subset 116 is cropped from the build data set 108 such that the build data subset 116 represents the surface geometry 112 of the article 102 previously identified and selected (e.g., block 1006).

In one or more examples, the method 1000, such as the step of (block 1036) processing includes a step of (block 1040) meshing at least a portion of the build data set 108, such as the build data subset 116. In one or more examples, meshing is an image-based meshing process for creating a computer model, such as a point cloud, from the build data subset 116.

In one or more examples, the method 1000 includes a step of (block 1042) generating a build point cloud 120. The build point cloud 120 is generated based on the processing steps performed on the build data set 108. In one or more examples, the build point cloud 120 is generated using the build data subset 116 and represents (e.g., is a three-dimensional representation of) the surface geometry 112 of the article 102 that was present in both the metrology data set 104 and the build data set 108 as previously identified and selected (e.g., block 1006). The build point cloud 120 is in the build coordinate system 110. As such, each data point of the build point cloud 120 has a XYZ-coordinate value in the build coordinate system 110.

In one or more examples, the method 1000 includes a step of (block 1044) serializing the build point cloud 120. Serializing the build point cloud 120 enables archiving, storage, and retrieval of the build point cloud 120 for purposes of reuse.

Referring to FIGS. 1A and 1B, in one or more examples, the metrology point cloud 118 and the build point cloud 120 generated according to the first set of operations directed to processing inputs and setting up the ICP process (shown in FIG. 1A) are provided or otherwise used in the second set of operations directed to performing the ICP process (shown in FIG. 1B).

Referring to FIG. 1B and to FIG. 2, in one or more examples, the method 1000 includes a step of (block 1046) obtaining the metrology point cloud 118 and a step of (block 1048) obtaining the build point cloud 120. The metrology point cloud 118 and the build point cloud 120 can be obtained directly from a processing operation of the computer 164. Alternatively, the metrology point cloud 118 and the build point cloud 120 can be obtained from computer storage 176.

Referring to FIG. 1B and to FIG. 2, in one or more examples, the method 1000 includes a step of (block 1050) setting up the point clouds the metrology point cloud 118 and the build point cloud 120 for the ICP process. The setup process prepares the metrology point cloud 118 and the build point cloud 120 for the ICP process.

In one or more examples, the method 1000, such as the step of (block 1050) setting up includes a step of (block 1052) loading the metrology point cloud 118 and the build point cloud 120. In one or more examples, the metrology point cloud 118 and the build point cloud 120 are loaded into a processing application executed by the computer 164.

In one or more examples, the method 1000, such as the step of (block 1050) setting up includes a step of (block 1054) pre-aligning the metrology point cloud 118 and the build point cloud 120. In one or more examples, pre-alignment of the metrology point cloud 118 and the build point cloud 120 is performed automatically by a processing application executed by the computer 164 based on a predetermined set of alignment parameters. Pre-alignment of the metrology point cloud 118 and the build point cloud 120 positions the point clouds in an initially close match to one another, for example, based on some geometric feature of the article 102 represented in both the metrology point cloud 118 and the build point cloud 120.

In one or more examples, the method 1000, such as the step of (block 1050) setting up includes a step of (block 1056) inspecting the metrology point cloud 118 and the build point cloud 120. In one or more examples, inspection of the metrology point cloud 118 and the build point cloud 120 is performed by determining (block 1058) whether the metrology point cloud 118 is a subset of the build point cloud 120. In other words, it is desirable for an entirety of the metrology point cloud 118 to be contained within the build point cloud 120. If it is determined (e.g., block 1058) that the point clouds are appropriate subsets, then manipulation of the metrology point cloud 118 and the build point cloud 120 is performed. If it is determined (e.g., block 1058) that the point clouds are not appropriate subsets, then the process of pre-alignment (e.g., block 1054) and inspection (e.g., block 1056) are repeated.

Referring to FIG. 1B and to FIG. 2, in one or more examples, the method 1000 includes a step of (block 1060) manipulating the metrology point cloud 118 and the build point cloud 120. In one or more examples, the pre-alignment (e.g., initial guess) of the metrology point cloud 118 and the build point cloud 120 is manipulated with rotations, translations, and/or scalars until the pre-alignment is deemed adequate. In one or more examples, the step of (block 1060) manipulating includes a step of (block 1062) adjusting parameters of the pre-alignment, such as selecting at least one of a rotation, a translation, and/or a scalar. In one or more examples, the step of (block 1060) manipulating includes a step of (block 1064) applying the parameters, such as at least one of a rotation, a translation, and/or a scalar to one or both of the metrology point cloud 118 and the build point cloud 120. In one or more examples, the step of (block 1060) manipulating includes a step of (block 1066) inspecting the alignment of the metrology point cloud 118 and the build point cloud 120. These process steps can be repeated as needed until the pre-alignment of the metrology point cloud 118 and the build point cloud 120 is deemed adequate for the ICP process. In one or more examples, the method 1000 includes a step of (block 1068) rebuilding the initial guess and updating the rendering of the metrology point cloud 118 and the build point cloud 120.

Referring to FIG. 1B and to FIG. 2, in one or more examples, the method 1000 includes a step of (block 1068) triggering execution of the ICP process. In one or more examples, the ICP process is performed by execution of an application by the computer 164. In one or more examples, the ICP process is performed based on an ICP algorithm 132. In one or more examples, the ICP algorithm 132 is executed with fast run parameters.

In one or more examples, the method 1000 includes a step of (block 1070) determining whether the results of the ICP process (e.g., block 1068) are reasonable. If it is determined (e.g., block 1070) that the results are reasonable, then the method 1000 includes a step of (block 1072) triggering execution of the ICP process. In one or more examples, the ICP process is performed by execution of an application by the computer 164. In one or more examples, the ICP process is performed based on the ICP algorithm 132. In one or more examples, the ICP algorithm 132 is executed with high resolution run parameters. If it is determined (e.g., block 1070) that the results are not reasonable, then the method 1000 includes a step of (block 1074) determining whether there is an issue with problem setup. If it is determined (e.g., block 1074) that there is not an issue with problem setup, then the process returns to manipulation of the point clouds (e.g., block 1060) and the process continues. If it is determined (e.g., block 1074) that there is an issue with problem setup, then the method 1000 includes a step of (block 1076) regenerating the point clouds, such as at least one of the metrology point cloud 118 and the build point cloud 120.

Referring to FIG. 1B and to FIG. 2, in one or more examples, the method 1000 includes a step of (block 1078) reviewing the ICP process. In one or more examples, the method 1000, such as the step of (block 1078) reviewing includes a step of (block 1080) setting up objective ICP functions. In one or more examples, the method 1000, such as the step of (block 1078) reviewing includes a step of (block 1082) adapting to the mapping type, for example, rigid, affine, non-conformal, and the like. In one or more examples, the method 1000, such as the step of (block 1078) reviewing includes a step of (block 1084) adjusting callback for ICP trimming. In one or more examples, the method 1000, such as the step of (block 1078) reviewing includes a step of (block 1086) running ICP optimization. In one or more examples, the method 1000, such as the step of (block 1078) reviewing includes a step of (block 1088) manipulating the results of the ICP process (e.g., block 1068), such as, into meaningful (e.g., human readable) measures for transform results and goodness of fit.

In one or more examples, the method 1000 includes a step of (block 1090) determining whether the results of the ICP process (e.g., block 1068 and/or block 1072) are reasonable. If it is determined (e.g., block 1090) that the results are not reasonable, then the step of (block 1074) determining whether an issue with problem setup exists is readdressed. If it is determined (e.g., block 1090) that the results are reasonable, then the method 1000 includes a step of (block 1092) accepting the results as a registration transform 122, also referred to herein simply as the transform 122.

In one or more examples, the method 1000 includes a step of (block 1094) serializing the transform 122. Serializing the transform 122 enables archiving, storage, and retrieval of the transform 122 for purposes of reuse.

Referring to FIGS. 1B and 1C, in one or more examples, the transform 122 generated by the ICP processes (e.g., block 1068 and/or block 1072) and according to the second set of operations directed to performing the ICP process (shown in FIG. 1B) is provided or otherwise used in third set of operations directed to inspecting the results of the ICP process and applying the transform.

Referring to FIG. 1C and to FIG. 2, in one or more examples, the method 1000 includes a step of (block 1096) obtaining the metrology data set 104, a step of (block 1098) obtaining the build data set 108, and a step of (block 1100) obtaining the transform 122. In one or more examples, the method 1000 includes a step of (block 1102) setting up the transform 122. In one or more examples, the method 1000, such as the step of (block 1102) setting up includes a step of (block 1104) loading the metrology data set 104 and a step of (block 1106) loading the build data set (108).

In one or more examples, the method 1000 includes a step of (block 1108) applying the transform 122. For example, the step of (block 1108) applying the transform 122 includes a step of (block 1110) applying the transform 122 to the metrology data set 104. Application of the transform 122 to the metrology data set 104 registers the metrology data set 104 to the build coordinate system 110. For example, the transform 122 includes at least one of a rotation, a translation, and/or a scalar that is applied to the metrology data set 104 in the metrology coordinate system 106 such that after application, the metrology data set 104 is registered to the build coordinate system 110.

In one or more examples, the method 1000 includes a step of (block 1112) inspecting (e.g., fly-through) the corresponding point clouds (e.g., the metrology point cloud 118 and/or the build point cloud 120). In one or more examples, the transform 122 is applied to and is inspected for any metrology data subset 114 of the metrology data set 104 or the metrology point cloud 118 generated or rendered from the metrology data subset 114. In one or more examples, the transform 122 is applied to and is inspected for an entirety of the metrology data set 104 or the metrology point cloud 118 generated or rendered from the entirety of the metrology data set 104.

Referring to FIG. 2, by way of examples, the present disclosure is also directed to a system 100 for registering data to a coordinate system. In one or more examples, the system 100 is located in an analysis environment 186 in which the method 1000 is implemented. In one or more examples, the system 100 is configured to perform a series of operations that implement at least a portion of the method 1000. In one or more examples, the system 100 includes or is implemented using the computer 164. For example, the system 100 is a computer-implemented system. In one or more examples, the computer 164 executes instructions 168 to perform the operations performed by the system 100. In these examples, the computer 164 may include one or more computers, computing devices, or computing systems. When the computer 164 includes more than one computer, the computers may be in communication with each other using any number of wired, wireless, optical, or other types of communications links.

In one or more examples, the system 100 includes a data processor 180. The data processor 180 is configured or adapted to perform one or more of the processing operations of the method 1000 applied to the metrology data set 104, the metrology data subset 114, the build data set 108, and the build data subset 116. In one or more examples, the system 100 includes a point cloud generator 182. The point cloud generator 182 is configured or adapted to perform one or more of the processing operations of the method 1000 applied to the metrology point cloud 118 and the build point cloud 120, such as generating the point clouds from the data subsets. In one or more examples, the system 100 includes a point cloud analyzer 184. The point cloud analyzer 184 is configured or adapted to perform one or more of the processing operations of the method 1000 applied to the metrology point cloud 118 and the build point cloud 120, such as executing the ICP algorithm 132.

In one or more examples, the data processor 180, the point cloud generator 182, and the point cloud analyzer 184 are implemented using software, hardware, firmware, or a combination thereof. For example, the data processor 180, the point cloud generator 182, and the point cloud analyzer 184 are implemented by the processor 166 executing the instructions 168 to perform a series of operations.

In one or more examples, the system 100 includes a user interface (UI) 174. The user interface 174, such as a graphical user interface. In one or more examples, application of one or more of the data processor 180, the point cloud generator 182, and the point cloud analyzer 184 is graphically displayed to a user by the user interface 174.

Referring to FIGS. 3-6 and to FIG. 1, which graphically illustrates different examples of the user interface 174 during execution of different operations or operational steps of the method 1000 (FIG. 1).

Figure 3:
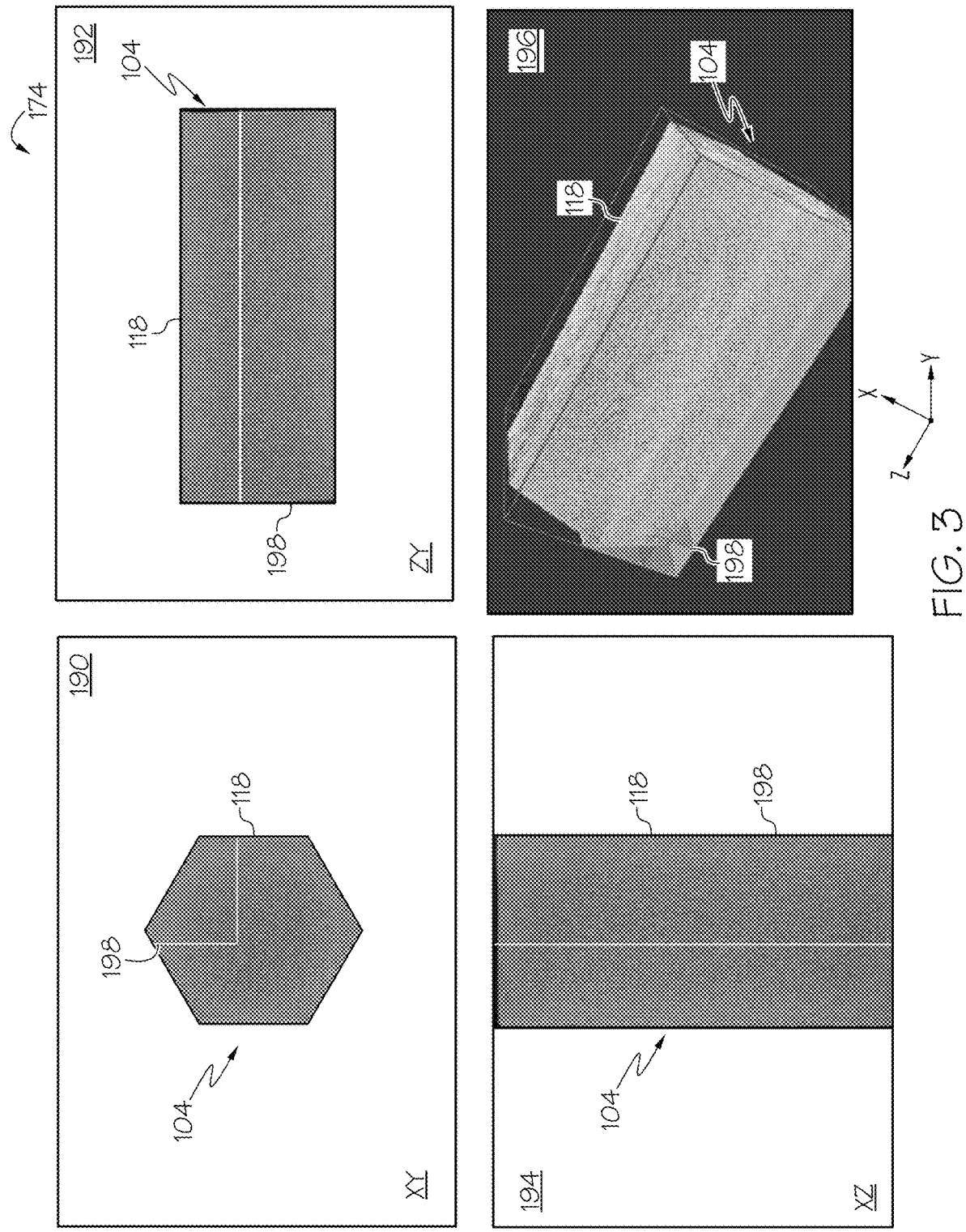
FIG. 3 is an illustration of an example of a user interface for selecting a subset of a metrology data set.

Referring to FIG. 3 and to FIG. 1A, in one or more examples, the user interface 174 graphically illustrates the metrology data set 104, for example, after the metrology data set 104 is loaded (e.g., block 1008) and rendered by the computer 164. In one or more examples, the metrology data set 104, or a rendering thereof, is visually represented and displayed by the user interface 174. As an example, an entirely of the metrology data set 104 is represented as a three-dimensional point cloud (e.g., the metrology point cloud 118). The user interface 174 displays the point cloud representation of the metrology data set 104 in various views, such as in two-dimensional (e.g., cross-sectional) views, including, for example, an XY-plane view 190, a ZY-plane view 192, and an XZ-plane view 194, and in a three-dimensional view 196. The user interface 174 enables inspection (e.g., identification and selection) of corresponding ones of the surface geometry 112 of the article 102 represented by the metrology data set 104 and the build data set 108 (e.g., block 1006). The user interface 174 enables manipulation of the metrology data set 104 (e.g., the metrology point cloud 118) such that a crop 198 corresponding to the surface geometry 112 can be defined (e.g., block 1012).

Figure 4:
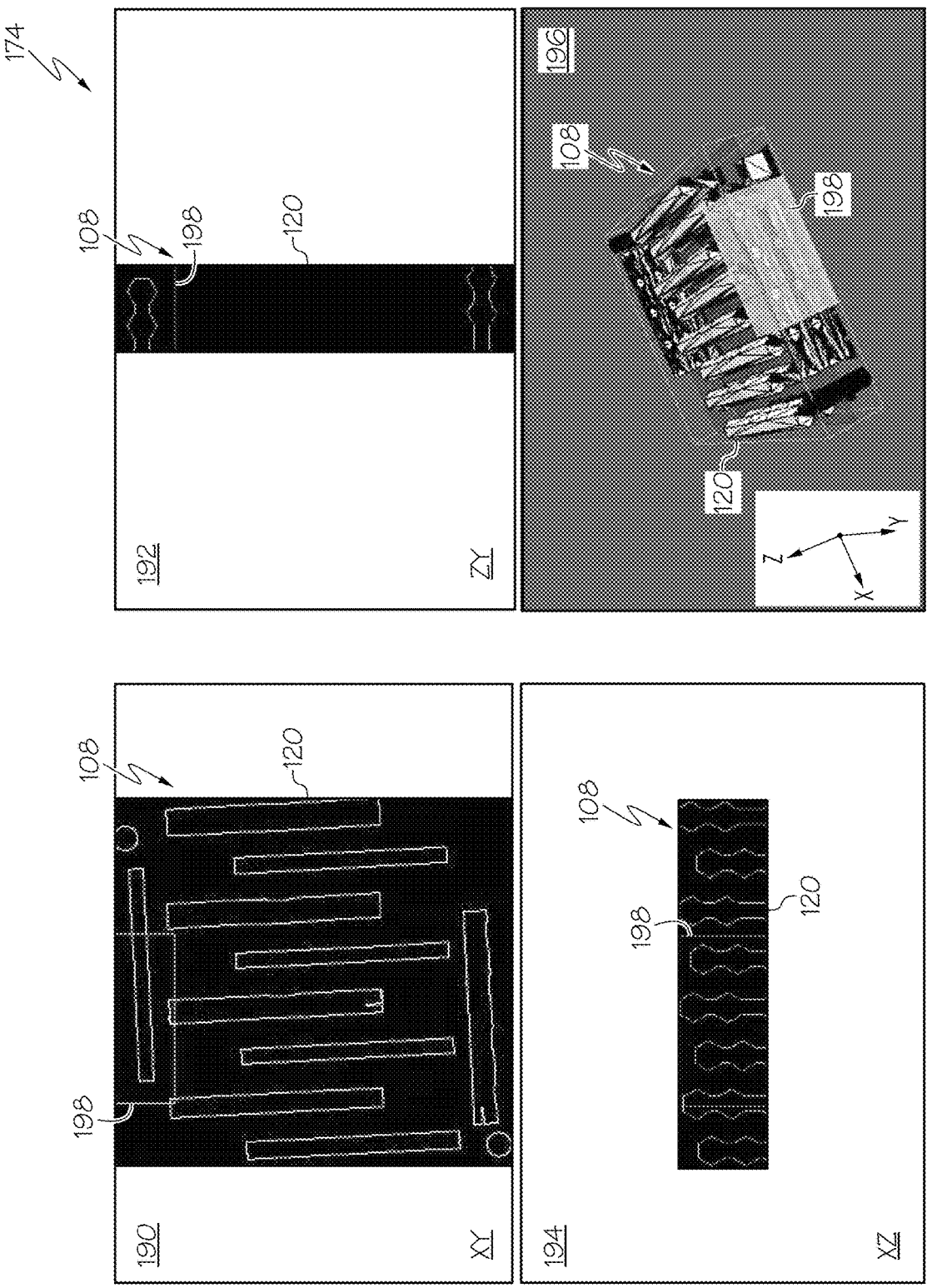
FIG. 4 is an illustration of an example of the user interface for selecting a subset of a build data set.

Referring to FIG. 4 and to FIG. 1A, in one or more examples, the user interface 174 graphically illustrates the build data set 108, for example, after the build data set 108 is loaded (e.g., block 1010) and rendered by the computer 164. In one or more examples, the build data set 108, or a rendering thereof, is visually represented and displayed by the user interface 174. As an example, an entirely of the build data set 108 is represented as a three-dimensional point cloud (e.g., the build point cloud 120). The user interface 174 displays the point cloud representation of the build data set 108 in various views, such as in two-dimensional (e.g., cross-sectional) views, including, for example, the XY-plane view 190, the ZY-plane view 192, and the XZ-plane view 194, and in the three-dimensional view 196. The user interface 174 enables inspection (e.g., identification and selection) of corresponding ones of the surface geometry 112 of the article 102 represented by the metrology data set 104 and the build data set 108 (e.g., block 1006). The user interface 174 enables manipulation of the build data set 108 (e.g., the build point cloud 120) such that the crop 198 corresponding to the surface geometry 112 can be defined (e.g., block 1014).

Figure 5:
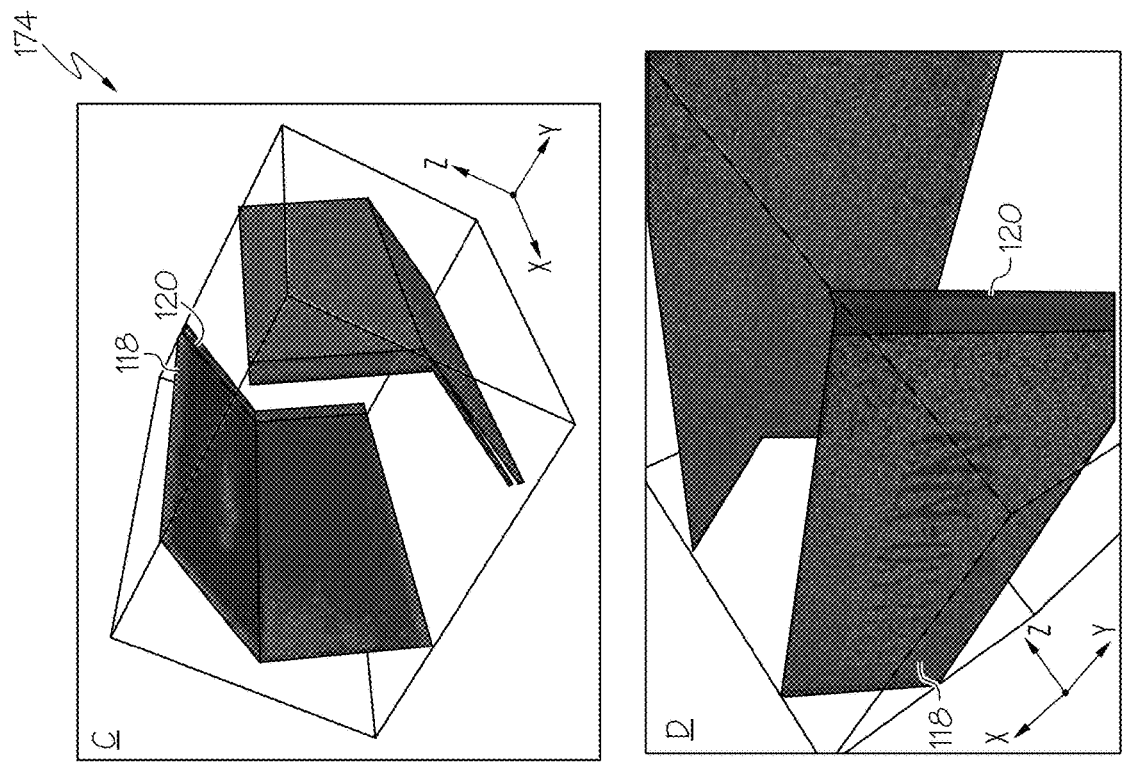
FIG. 5 is an illustration of an example of the user interface for registering a metrology point cloud and a build point cloud and determining a transform.
Figure 5:
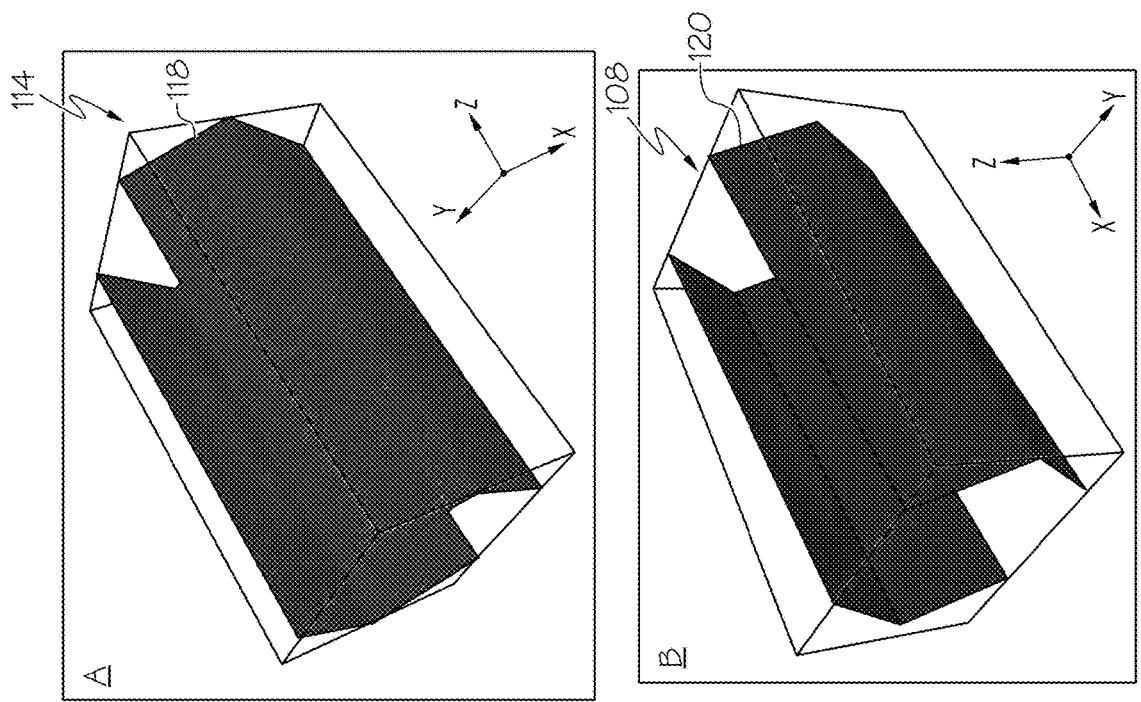

Referring to FIG. 5 and to FIGS. 1A and 1B, in one or more examples, the user interface 174 graphically illustrates one or more of the operation step of (block 1020) processing the metrology data set 104, step of (block 1036) processing the build data set 108, step of (block 1032) generating the metrology point cloud 118, step of (block 1042) generating the build point cloud 120, step of (block 1050) setting up the point clouds, step of (block 1060) manipulating the point clouds, and step of (block 1068 and/or block 1072) triggering the ICP. As shown in sector A of FIG. 5, in one or more examples, the user interface 174 displays the metrology point cloud 118 generated from the metrology data subset 114 after cropping (e.g., block 1022), decimating (e.g., block 1024), thresholding (e.g., block 1026), extracting (e.g., block 1028), and meshing (e.g., block 1030). As shown in sector B of FIG. 5, in one or more examples, the user interface 174 displays the build point cloud 120 generated from the build data subset 116 after cropping (e.g., block 1038) and meshing (e.g., block 1040). As shown in sector C of FIG. 5, in one or more examples, the user interface 174 enables manipulation of the metrology point cloud 118 and the build point cloud 120 (e.g., the cropped portions of the data sets), such as pre-aligning (e.g., block 1054) and inspecting (e.g., block 1056) the metrology point cloud 118 and the build point cloud 120 and determining (e.g., block 1058) whether the metrology point cloud 118 is a subset of the build point cloud 120. As shown in sector D of FIG. 5, in one or more examples, the user interface 174 enables a visual display of the results of the ICP process (e.g., execution of the ICP algorithm 132) for review of the registration transform (e.g., transform 122) resulting from the ICP process.

Figure 6:
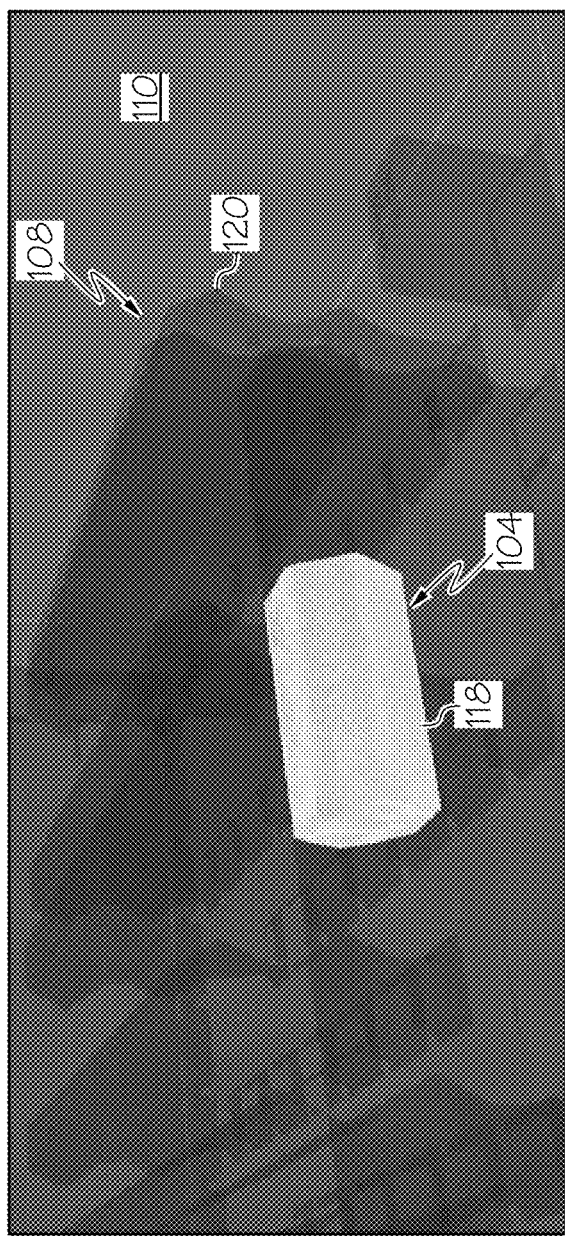
FIG. 6 is an illustration of an example of the user interface for applying the transform to the metrology data set.

Referring to FIG. 6 and to FIG. 1C, in one or more examples, the user interface 174 graphically illustrates a resulting application (e.g., block 1108) of the transform 122 on the metrology data set 104 (e.g., the metrology point cloud 118) to register the metrology data set 104 to the build coordinate system 110 and align the metrology data set 104 with the build data set 108.

Figure 7A:
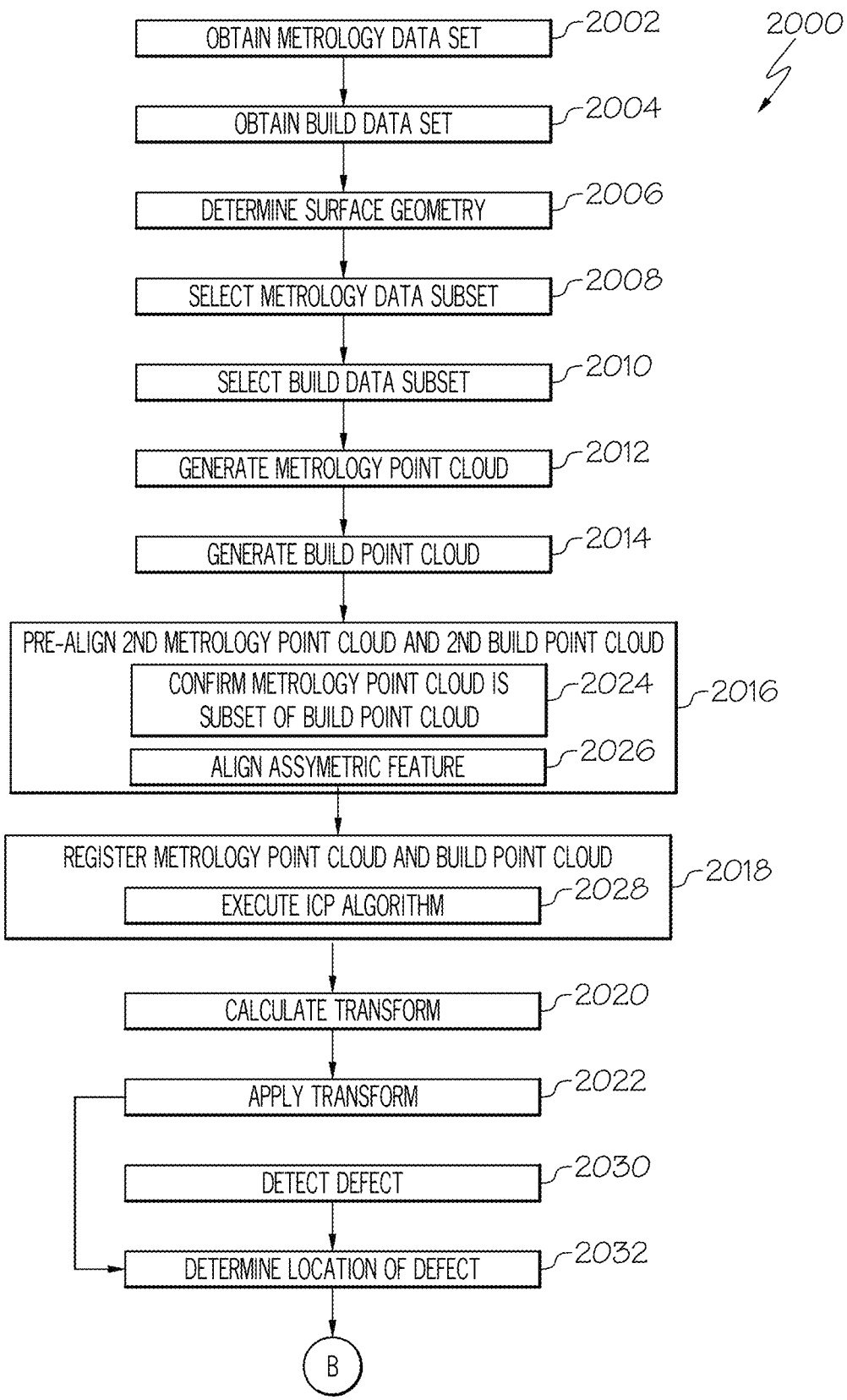
FIG. 7 (FIGS. 7A and 7B) is a flow diagram of another example of a method for registering data to a coordinate system.
Figure 7B:
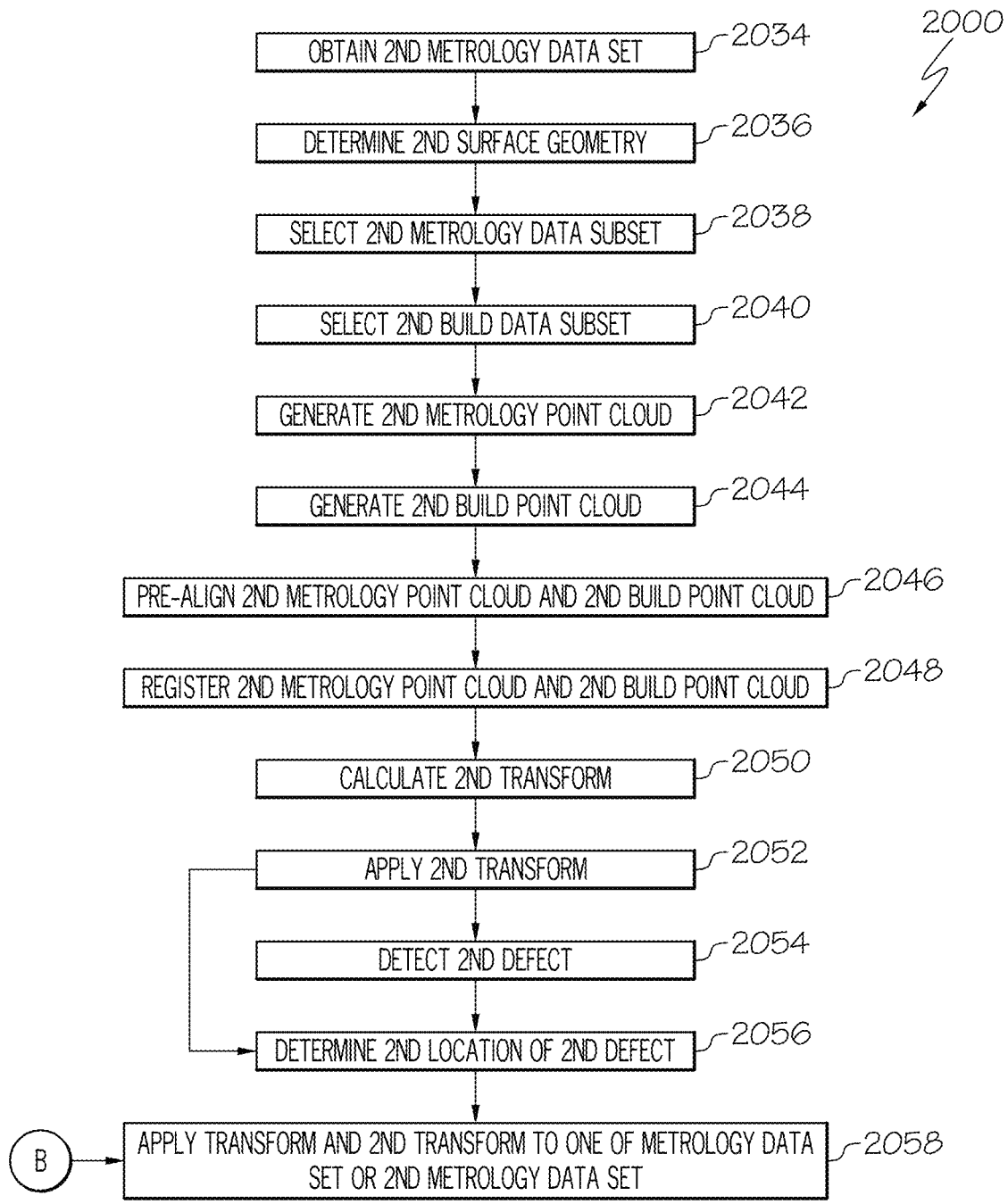

Referring now to FIGS. 7A and 7B and to FIGS. 2-6, by way of examples, the present disclosure is also directed to a computer-implemented method 2000 for registering data to a coordinate system. In one or more examples, the method 2000 is an example implementation of at least a portion of the method 1000 (FIG. 1).

Referring to FIG. 7A and to FIG. 2, in one or more examples, the method 2000 includes a step of (block 2002) obtaining the metrology data set 104 that represents the article 102 in the metrology coordinate system 106. The method 2000 includes a step of (block 2004) obtaining the build data set 108 that represents the article 102 in the build coordinate system 110. The method 2000 includes a step of (block 2006) determining (e.g., identifying and/or selecting) the surface geometry 112 of the article 102 that is present in the metrology data set 104 and the build data set 108. The method 2000 includes a step of (block 2008) selecting the metrology data subset 114 from the metrology data set 104 that represents the surface geometry 112 of the article 102. The method 2000 includes a step of (block 2010) selecting the build data subset 116 from the build data set 108 that represents the surface geometry 112 of the article 102. The method 2000 includes a step of (block 2012) generating the metrology point cloud 118 from the metrology data subset 114 in the metrology coordinate system 106. The method 2000 includes a step of (block 2014) generating the build point cloud 120 from the build data subset 116 in the build coordinate system 110. The method 2000 includes a step of (block 2016) pre-aligning the metrology point cloud 118 and the build point cloud 120. The method 2000 includes a step of (block 2018) registering the metrology point cloud 118 and the build point cloud 120. The method 2000 includes a step of (block 2020) calculating the transform 122 between the metrology coordinate system 106 and the build coordinate system 110. The method 2000 includes a step of (block 2022) applying the transform 122 to the metrology data set 104 to convert the metrology data set 104 to the build coordinate system 110.

Referring to FIG. 7A and to FIG. 2, in one or more examples, according to the method 2000, the metrology data set 104 includes the voxel data set 124 from the computed tomography (CT) file 126. In one or more examples, the build data set 108 includes the mesh data set 128 from the build file 130.

Referring to FIG. 7A and to FIG. 2, in one or more examples, the step of (block 2016) pre-aligning includes a step of (block 2024) confirming that the metrology point cloud 118 is a subset of the build point cloud 120. In other words, the step of (block 2016) pre-aligning includes a step of confirming that an entirety of the metrology data subset 114 or the metrology point cloud 118 is contained within the build data subset 116 or the build point cloud 120.

Referring to FIG. 7A and to FIG. 2, in one or more examples, the step of (block 2016) pre-aligning includes a step of (block 2026) aligning an asymmetric feature 134 represented in the surface geometry 112. As an example, the article 102 is manufactured or otherwise fabricated such that the article 102 includes at least one asymmetric feature 134 located, formed, or otherwise disposed on a surface of the article 102. In one or more examples, the asymmetric feature 134 forms a portion of the surface geometry 112 that is identified as being present in the both metrology data set 104 and the build data set 108 and that is selected as being represented by both the metrology data subset 114 and the build data subset 108. Examples, of the asymmetric feature 134 include a divot, a recess, a protrusion, and the like having any suitable asymmetric two-dimensional perimeter shape.

Referring to FIG. 7A and to FIG. 2, in one or more examples, the step of (block 2018) registering includes a step of (block 2028) executing the iterative closest point (ICP) algorithm 132. As described above, in one or more examples, the iterative closest point (ICP) algorithm 132 can be executed one or more times, such as with fast run parameters and/or high resolution run parameters.

Accordingly, examples of the method 2000 (FIGS. 7A and 7B), like examples of the method 1000 (FIG. 1), facilitate registering data to a coordinate system that is not native to the data, such as registering the metrology data set 104 to the build coordinate system 110 by determining the transform 122 and then applying the transform 122 to the metrology data set 104, thereby converting the metrology data set 104 from the metrology coordinate system 106 to the build coordinate system 110. This conversion to a different, non-native coordinate system, advantageously enables different types of data sets (e.g., design and metrology) to be aligned with one another for comparison during analysis of nondestructive testing results. Accordingly, in one or more examples, the method 2000 is also directed to a process for analyzing nondestructive testing results.

Referring to FIG. 7A and to FIG. 2, in one or more examples, the method 2000 includes a step of (block 2030) detecting a defect 156 in the article 102 represented by the metrology data set 104. As an example, the defect 156 can be detected using any suitable data analysis process, such as by analyzing the intensity of the voxels in the metrology data set 104 (e.g., CT file 126) to represent the density of the article 102.

Referring to FIG. 7A and to FIG. 2, in one or more examples, the method 2000 includes a step of (block 2032) determining a location 158 of the defect 156 in the build coordinate system 110. For example, the defect 156 is identified or otherwise detected in the metrology data set 104, thereby also providing the location 158 of the defect 156 in the metrology coordinate system 106. The transform 122 is applied to the metrology data set 104 to register the metrology data set 104 to the build coordinate system 110, thereby providing the location 158 in the build coordinate system 110.

Accordingly, examples of the method 2000 (FIGS. 7A and 7B), like examples of the method 1000 (FIG. 1), facilitate determining a location of a defect, determined from metrology data, relative to a coordinate system that is not native to the metrology data, such as by applying the transform 122 to the metrology data set 104, thereby converting the metrology data set 104 from the metrology coordinate system 106 to the build coordinate system 110 and determining the location 158 of the defect 156 in the build coordinate system 100. This conversion to a different, non-native coordinate system, advantageously enables locations of interior portions of the article 102 represented in metrology data sets to be located in the build coordinate system 110. This conversion also advantageously enables different types of metrology data sets to be aligned with one another for comparison during analysis of nondestructive testing results. Accordingly, in one or more examples, the method 2000 is also directed to a process for comparing different types of metrology data (e.g., nondestructive testing results) obtained by different nondestructive testing methods.

Referring to FIG. 7B and to FIG. 2, in one or more examples, the method 2000 includes a step of (block 2034) obtaining a second metrology data set 136 that represents the article 102 in a second metrology coordinate system 138. The method 2000 includes a step of (block 2036) determining a second surface geometry 140 of the article 102 that is present in the second metrology data set 136 and the build data set 108. The method 2000 includes a step of (block 2038) selecting a second metrology data subset 142 from the second metrology data set 136 that represents the second surface geometry 140 of the article 102. The method 2000 includes a step of (block 2040) selecting a second build data subset 144 from the build data set 108 that represents the second surface geometry 140 of the article 102. The method 2000 includes a step of (block 2042) generating a second metrology point cloud 146 from the second metrology data subset 142 in the second metrology coordinate system 138. The method 2000 includes a step of (block 2044) generating a second build point cloud 148 from the second build data subset 144 in the build coordinate system 110. The method 2000 includes a step of (block 2046) pre-aligning the second metrology point cloud 146 and the second build point cloud 148. The method 2000 includes a step of (block 2048) registering the second metrology point cloud 146 and the second build point cloud 148. The method 2000 includes a step of (block 2050) calculating a second transform 150 between the second metrology coordinate system 138 and the build coordinate system 110. The method 2000 includes a step of (block 2052) applying the second transform 150 to the second metrology data set 136 to convert the second metrology data set 136 to the build coordinate system 110.

In one or more examples, the second surface geometry 140 and the surface geometry 112 are the same. In these examples, the second build data subset 144 is the same as the build data subset 116 and the second build point cloud 148 is the same as the build point cloud 120. In other examples, the second surface geometry 140 and the surface geometry 112 are different. In these examples, the second build data subset 144 is different than the build data subset 116 and the second build point cloud 148 is different than the build point cloud 120.

Referring to FIG. 7B and to FIG. 2, in one or more examples, according to the method 2000, the metrology data set 104, the build data set 108, and the second metrology data set 136 include different types of data. In one or more examples, the metrology data set 104 includes the voxel data set 124 from the computed tomography file 126. In one or more examples, the build data set 108 includes the mesh data set 128 from the build file 130. In one or more examples, the second metrology data set 136 includes the second voxel data set 152 from the optical thermography (OT) file 154.

Referring to FIG. 7B and to FIG. 2, in one or more examples, the method 2000 includes a step of (block 2054) detecting a second defect 160 in the article 102 represented by the second metrology data set 136. As an example, the second defect 160 can be detected using any suitable data analysis process, such as by analyzing the voxels in the second metrology data set 136 (e.g., OT file 154) to represent a nonconformity in the article 102.

Referring to FIG. 7B and to FIG. 2, in one or more examples, the method 2000 includes a step of (block 2056) determining a second location 162 of the second defect 160 in the build coordinate system 110. For example, the second defect 160 is identified or otherwise detected in the second metrology data set 136, thereby also providing the second location 162 of the second defect 160 in the second metrology coordinate system 138. The second transform 150 is applied to the second metrology data set 136 to register the second metrology data set 136 to the build coordinate system 110, thereby providing the second location 162 in the build coordinate system 110.

Referring to FIG. 7B and to FIG. 2, in one or more examples, the method 2000 includes a step of (block 2058) applying the transform 122 and the second transform 150 to the metrology data set 104 to convert the metrology data set 104 to the second metrology coordinate system 138. Converting or registering the metrology data set 104 to the second metrology coordinate system 138 enables comparison of the location 158 of the defect 156 and the second location 162 of the second defect 160, thereby enabling analysis of the defects and between different types of metrology or nondestructive testing methods. As an example, the method 2000 includes a step of matching the defect 156 and the second defect 160. For example, the defect 156 is identified or otherwise detected in the metrology data set 104, thereby also providing the location 158 of the defect 156 in the metrology coordinate system 106. The transform 122 is applied to the metrology data set 104 to register the metrology data set 104 to the build coordinate system 110, thereby providing the location 158 in the build coordinate system 110. An inverse of the second transform 150 is then applied to the metrology data set 104 to register the metrology data set 104 to the second metrology coordinate system 138, thereby providing the location 158 of the defect 156 in the second metrology coordinate system 138. Upon registration, the defect 156 represented in the metrology data set 104 at the location 158 in the second metrology coordinate system 138 can be compared to the same location represented in the second metrology data set 136 and, matched to a potential second defect 160 at the corresponding second location 162.

Referring to FIG. 2 and to FIGS. 1A, 1B, 1C, 7A and 7B, in one or more examples, the system 100 is configured or adapted to implement the method 1000 (FIG. 1) and/or the method 2000 (FIGS. 7A and 7B). In one or more examples, the system 100 includes the computer 164 including the processor 166 programmed with the instructions 168 that, when executed by the processor 166, causes the computer 164 to obtain the metrology data set 104 that represents the article 102 in the metrology coordinate system 106. The instructions 168, when executed by the at least one processor 166, further causes the computer 164 to obtain the build data set 108 that represents the article 102 in the build coordinate system 110. The instructions 168, when executed by the at least one processor 166, further causes the computer 164 to determine the surface geometry 112 of the article 102 that is present in the metrology data set 104 and the build data set 108. The instructions 168, when executed by the at least one processor 166, further causes the computer 164 to select the metrology data subset 114 from the metrology data set 104 that represents the surface geometry 112 of the article 102. The instructions 168, when executed by the at least one processor 166, further causes the computer 164 to select the build data subset 116 from the build data set 108 that represents the surface geometry 112 of the article 102. The instructions 168, when executed by the at least one processor 166, further causes the computer 164 to generate the metrology point cloud 118 from the metrology data subset 114 in the metrology coordinate system 106. The instructions 168, when executed by the at least one processor 166, further causes the computer 164 to generate the build point cloud 120 from the build data subset 116 in the build coordinate system 110. The instructions 168, when executed by the at least one processor 166, further causes the computer 164 to pre-align the metrology point cloud 118 and the build point cloud 120. The instructions 168, when executed by the at least one processor 166, further causes the computer 164 to register the metrology point cloud 118 and the build point cloud 120. The instructions 168, when executed by the at least one processor 166, further causes the computer 164 to calculate the transform 122 between the metrology coordinate system 106 and the build coordinate system 110. The instructions 168, when executed by the at least one processor 166, further causes the computer 164 to apply the transform 122 to the metrology data set 104 to convert the metrology data set 104 to the build coordinate system 110.

Referring to FIG. 2, in one or more examples, the system 100 includes the metrology instrument 170 that acquires the metrology data set 104.

Referring to FIG. 2 and to FIGS. 7A and 7B, in one or more examples, the instructions 168, when executed by the at least one processor 166, further causes the computer 164 to detect the defect 156 in the article 102 represented by the metrology data set 104. The instructions 168, when executed by the at least one processor 166, further causes the computer 164 to determine the location 158 of the defect 156 in the build coordinate system 110.

Referring to FIG. 2 and to FIGS. 7A and 7B, in one or more examples, the instructions 168, when executed by the at least one processor 166, further causes the computer 164 to obtain the second metrology data set 136 that represents the article 102 in the second metrology coordinate system 138. The instructions 168, when executed by the at least one processor 166, further causes the computer 164 to determine the second surface geometry 140 of the article 102 that is present in the second metrology data set 136 and the build data set 108. The instructions 168, when executed by the at least one processor 166, further causes the computer 164 to select the second metrology data subset 142 from the second metrology data set 136 that represents the second surface geometry 140 of the article 102. The instructions 168, when executed by the at least one processor 166, further causes the computer 164 to select the second build data subset 144 from the build data set 108 that represents the second surface geometry 140 of the article 102. The instructions 168, when executed by the at least one processor 166, further causes the computer 164 to generate the second metrology point cloud 146 from the second metrology data subset 142 in the second metrology coordinate system 138. The instructions 168, when executed by the at least one processor 166, further causes the computer 164 to generate the second build point cloud 148 from the second build data subset 144 in the build coordinate system 110. The instructions 168, when executed by the at least one processor 166, further causes the computer 164 to pre-align the second metrology point cloud 146 and the second build point cloud 148. The instructions 168, when executed by the at least one processor 166, further causes the computer 164 to register the second metrology point cloud 146 and the second build point cloud 148. The instructions 168, when executed by the at least one processor 166, further causes the computer 164 to calculate the second transform 150 between the second metrology coordinate system 138 and the build coordinate system 110. The instructions 168, when executed by the at least one processor 166, further causes the computer 164 to apply the second transform 150 to the second metrology data set 136 to convert the second metrology data set 136 to the build coordinate system 110.

Referring to FIG. 2 and to FIGS. 7A and 7B, in one or more examples, the instructions 168, when executed by at least the one processor 166, further causes the computer 164 to detect the second defect 160 in the article 102 represented by the second metrology data set 136. The instructions 168, when executed by the at least one processor 166, further causes the computer 164 to determine the second location 162 of the second defect 160 in the build coordinate system 110. The instructions 168, when executed by the at least one processor 166, further causes the computer 164 to apply the transform 122 and the second transform 150 to the metrology data set 104 to convert the metrology data set 104 to the second metrology coordinate system 138. The instructions 168, when executed by the at least one processor 166, further causes the computer 164 to match the defect 156 and the second defect 160.

Figure 8:
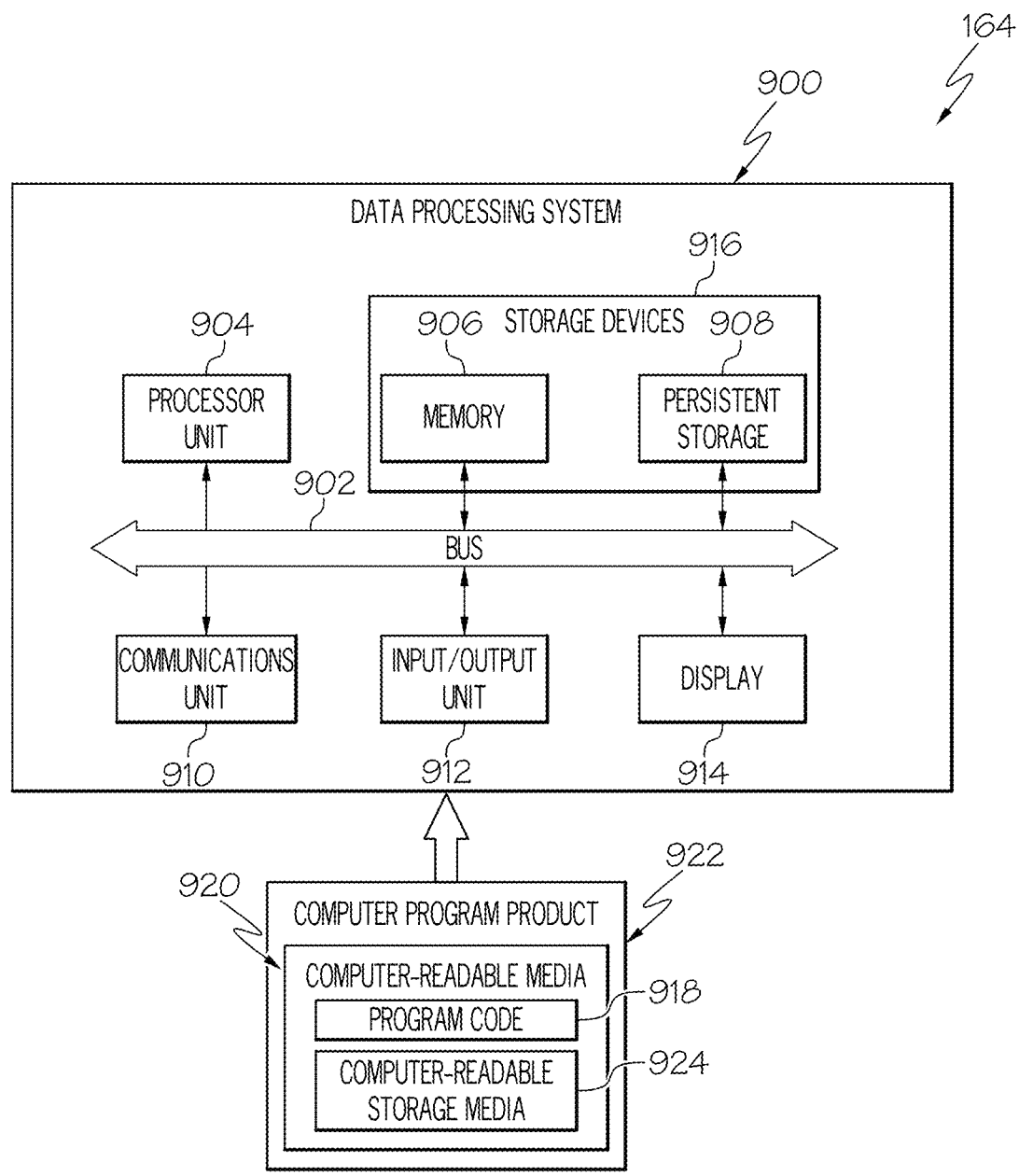
FIG. 8 is a block diagram of an example of a data processing system.

Referring now to FIG. 8 and to FIGS. 1A-7B, by way of examples, the present disclosure is also directed to a computer program product 922 for registering data to a coordinate system. In one or more examples, execution of the computer program product 922 is configured or adapted to implement the method 1000 (FIG. 1). In one or more examples, execution of the computer program product 922 is configured or adapted to implement the method 2000 (FIGS. 7A and 7B). In one or more examples, the computer program product 922 is executed using the system 100 (FIG. 2). The computer program product 922 includes a non-transitory computer-readable medium 920 storing program code 918 that, when executed by the computer 164, causes the computer 164 to perform operations.

In one or more examples, the operations include obtaining the metrology data set 104 that represents the article 102 in the metrology coordinate system 106. The operations include obtaining the build data set 108 that represents the article 102 in the build coordinate system 110. The operations include determining the surface geometry 112 of the article 102 that is present in the metrology data set 104 and the build data set 108. The operations include selecting the metrology data subset 114 from the metrology data set 104 that represents the surface geometry 112 of the article 102. The operations include selecting the build data subset 116 from the build data set 108 that represents the surface geometry 112 of the article 102. The operations include generating the metrology point cloud 118 from the metrology data subset 114 in the metrology coordinate system 106. The operations include generating the build point cloud 120 from the build data subset 116 in the build coordinate system 110. The operations include pre-aligning the metrology point cloud 118 and the build point cloud 120. The operations include registering the metrology point cloud 118 and the build point cloud 120. The operations include calculating the transform 122 between the metrology coordinate system 106 and the build coordinate system 110. The operations include applying the transform 122 to the metrology data set 104 to convert the metrology data set 104 to the build coordinate system 110.

In one or more examples, the operations include detecting the defect 156 in the article 102 represented by the metrology data set 104. The operations include determining the location 158 of the defect 156 in the build coordinate system 110.

Referring to FIG. 2, in one or more examples, the system 100 may be implemented using software, hardware, firmware, or a combination thereof. When software is used, the operations performed by the system 100 may be implemented using, for example, without limitation, program code configured to run on a processor unit. When firmware is used, the operations performed by the system 100 may be implemented using, for example, without limitation, program code and data and stored in persistent memory to run on a processor unit.

When hardware is employed, the hardware may include one or more circuits that operate to perform the operations performed by the system 100. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by the system 100 may be performed using organic components integrated with inorganic components. In some cases, the operations and processes may be performed by entirely organic components, excluding a human being. For example, circuits in organic semiconductors may be used to perform these operations and processes.

Referring to FIG. 8, in one or more examples, the computer 164 (FIG. 2) includes or takes the form of a data processing system 900. In one or more examples, the data processing system 900 includes a communications framework 902, which provides communications between at least one processor unit 904, one or more storage devices 916, such as memory 906 and/or persistent storage 908, a communications unit 910, an input/output unit 912 (I/O unit), and a display 914. In this example, the communications framework 902 takes the form of a bus system.

The processor unit 904 is an example of the processor 166 (FIG. 2) and serves to execute the instructions 168 (FIG. 2) for software that can be loaded into the memory 906. In one or more examples, the processor unit 904 is a number of processor units, a multi-processor core, or some other type of processor, depending on the particular implementation.

The memory 906 and the persistent storage 908 are examples of the storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. The storage devices 916 may also be referred to as computer readable storage devices in one or more examples. The memory 906 is, for example, a random-access memory or any other suitable volatile or non-volatile storage device. The persistent storage 908 can take various forms, depending on the particular implementation.

For example, the persistent storage 908 contains one or more components or devices. For example, the persistent storage 908 is a hard drive, a solid-state hard drive, a flash memory, a rewritable optical disk, a rewritable magnetic tape, or some combination of the above. The media used by the persistent storage 908 also can be removable. For example, a removable hard drive can be used for the persistent storage 908.

The communications unit 910 provides for communications with other systems or devices, such as the metrology instrument 170 (FIG. 2) or other computer systems. In one or more examples, the communications unit 910 is a network interface card.

Input/output unit 912 allows for input and output of data with other devices that can be connected to the data processing system 900. As an example, the input/output unit 912 provides a connection for user input through at least one of a keyboard, a mouse, or some other suitable input device. Further, the input/output unit 912 can send output to a printer. The display 914 provides a mechanism to display information to a user. For example, the user interface 174 is displayed to a user by the display 914.

Instructions (e.g., instructions 168) for at least one of the operating system, applications, or programs can be located in the storage devices 916, which are in communication with the processor unit 904 through the communications framework 902. The processes of the various examples and operations described herein can be performed by the processor unit 904 using computer-implemented instructions, which can be located in a memory, such as the memory 906.

The instructions 168 are referred to as program code, computer usable program code, or computer readable program code that can be read and executed by a processor of the processor unit 904. The program code in the different examples can be embodied on different physical or computer readable storage media, such as the memory 906 or the persistent storage 908.

In one or more examples, the program code 918 is located in a functional form on computer readable media 920 that is selectively removable and can be loaded onto or transferred to the data processing system 900 for execution by the processor unit 904. In one or more examples, the program code 918 and computer readable media 920 form the computer program product 922. In one or more examples, the computer readable media 920 is computer readable storage media 924.

In one or more examples, the computer readable storage media 924 is a physical or tangible storage device used to store the program code 918 rather than a medium that propagates or transmits the program code 918.

Alternatively, the program code 918 can be transferred to the data processing system 900 using a computer readable signal media. The computer readable signal media can be, for example, a propagated data signal containing the program code 918. For example, the computer readable signal media can be at least one of an electromagnetic signal, an optical signal, or any other suitable type of signal. These signals can be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different examples can be implemented. The different examples can be implemented in a data processing system including components in addition to or in place of those illustrated for the data processing system 900. Other components shown in FIG. 8 can be varied from the examples shown. The different examples can be implemented using any hardware device or system capable of running the program code 918.

Additionally, various components of the computer 164 and/or the data processing system 900 may be described as modules. For the purpose of the present disclosure, the term "module" includes hardware, software or a combination of hardware and software. As an example, a module can include one or more circuits configured to perform or execute the described functions or operations of the executed processes described herein (e.g., the method 1000 and/or the method 2000). As another example, a module includes a processor, a storage device (e.g., a memory), and computer-readable storage medium having instructions that, when executed by the processor causes the processor to perform or execute the described functions and operations. In one or more examples, a module takes the form of the program code 918 and the computer readable media 920 together forming the computer program product 922. In one or more examples, the data processor 180, the point cloud generator 182, and the point cloud analyzer 184 are implemented as modules.

Figure 9:
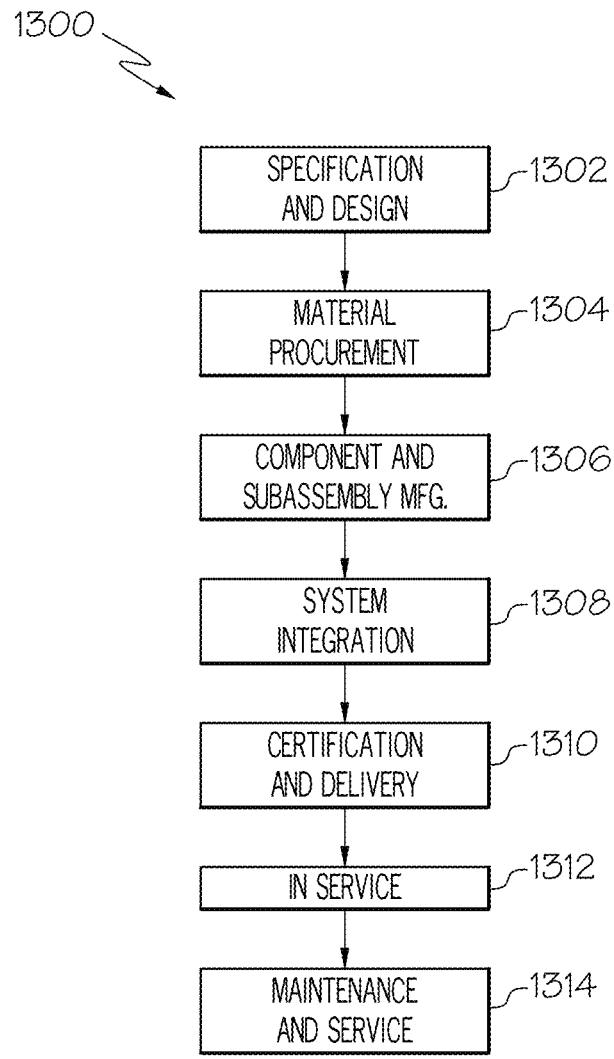
FIG. 9 is a flow diagram of an example of an aircraft manufacturing method.
Figure 10:
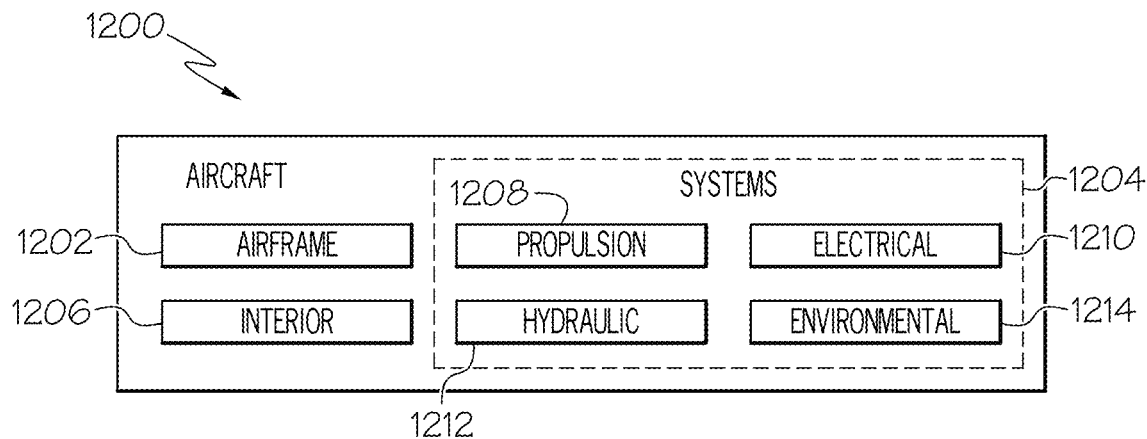
FIG. 10 is a schematic block diagram of an example of an aircraft.

Referring now to FIGS. 9 and 10, examples of the system 100, the method 1000, the method 2000, and/or the computer program product 922 described herein, may be related to, or used in the context of, an aircraft manufacturing and service method 1300, as shown in the flow diagram of FIG. 9 and the aircraft 1200, as schematically illustrated in FIG. 10. For example, the method 2000 and/or the computer program product 922 described herein can be used during a nondestructive evaluation (NDE) process, a manufacturing process, or additive manufacturing process associated with aircraft 1200.

Referring to FIG. 10, which illustrates examples of the aircraft 1200. The aircraft 1200 includes an airframe 1202 having an interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to an airframe 1202 of the aircraft 1200, such as for example, flaps, spoilers, ailerons, slats, rudders, elevators, and trim tabs. In yet other examples, the onboard systems 1204 also includes one or more other systems, such as, but not limited to, communications systems, avionics systems, software distribution systems, network communications systems, passenger information/entertainment systems, guidance systems, radar systems, weapons systems, and the like. The aircraft 1200 may include various structures that includes the article 102, which has been analyzed using the system 100 and/or according to the method 1000 or the method 2000.

Referring to FIG. 9, during pre-production of the aircraft 1200, the method 1300 includes specification and design of the aircraft 1200 (block 1302) and material procurement (block 1304). During production of the aircraft 1200, component and subassembly manufacturing (block 1306) and system integration (block 1308) of the aircraft 1200 take place. Thereafter, the aircraft 1200 goes through certification and delivery (block 1310) to be placed in service (block 1312). Routine maintenance and service (block 1314) includes modification, reconfiguration, refurbishment, etc. of one or more systems of the aircraft 1200.

Each of the processes of the method 1300 illustrated in FIG. 9 may be performed or carried out by a system integrator, a third party, and/or an operator (e.g., a customer). For the purposes of this description, a system integrator may include, without limitation, any number of spacecraft manufacturers and major-system subcontractors;

a third party may include, without limitation, any number of vendors, subcontractors, and suppliers; and an operator may be an airline, leasing company, military entity, service organization, and so on.

Examples of the system 100, the method 1000, the method 2000, and the computer program product 922 shown and described herein, may be employed during any one or more of the stages of the manufacturing and service method 1300 shown in the flow diagram illustrated by FIG. 9. In an example, an article 102 analyzed or inspected using the system 100 and/or according to the method 1000 or the method 2000 may form a portion of component and subassembly manufacturing (block 1306) and/or system integration (block 1308). Further, an article 102 analyzed or inspected using the system 100 and/or according to the method 1000 or the method 2000 may be implemented in a manner similar to components or subassemblies prepared while the aircraft 1200 is in service (block 1312). Also, an article 102 analyzed or inspected using the system 100 and/or according to the method 1000 or the method 2000 may be utilized during system integration (block 1308) and certification and delivery (block 1310). Similarly an article 102 analyzed or inspected using the system 100 and/or according to the method 1000 or the method 2000 may be utilized, for example and without limitation, while the aircraft 1200 is in service (block 1312) and during maintenance and service (block 1314).

Further, the disclosure comprises embodiments according to the following clauses:

Clause 1. A computer-implemented method 1000 comprising:
  obtaining a metrology data set 104 that represents an article 102 in a metrology coordinate system 106;
  obtaining a build data set 108 that represents the article 102 in a build coordinate system 110;
  determining a surface geometry 112 of the article 102 that is present in the metrology data set 104 and the build data set 108;
  selecting a metrology data subset 114 from the metrology data set 104 that represents the surface geometry 112 of the article 102;
  selecting a build data subset 116 from the build data set 108 that represents the surface geometry 112 of the article 102;
  generating a metrology point cloud 118 from the metrology data subset 114 in the metrology coordinate system 106;
  generating a build point cloud 120 from the build data subset 116 in the build coordinate system 110;
  pre-aligning the metrology point cloud 118 and the build point cloud 120;
  registering the metrology point cloud 118 and the build point cloud 120;
  calculating a transform 122 between the metrology coordinate system 106 and the build coordinate system 110; and
  applying the transform 122 to the metrology data set 104 to convert the metrology data set 104 to the build coordinate system 110.

Clause 2. The method 1000 of Clause 1, wherein the metrology data set 104 comprises a voxel data set 124 from a computed tomography file 126.

Clause 3. The method 1000 of Clause 1 or 2, wherein the build data set 108 comprises mesh data set 128 from a build file 130.

Clause 4. The method 1000 of any of Clauses 1 to 3, wherein the step of pre-aligning comprises confirming that the metrology point cloud 118 is a subset of the build point cloud 120.

Clause 5. The method 1000 of Clause 4, wherein the step of pre-aligning comprises aligning an asymmetric physical feature 134 represented in the surface geometry 112.

Clause 6. The method 1000 of any of Clauses 1 to 5, wherein the step of registering comprises executing an iterative closest point algorithm 132.

Clause 7. The method 1000 of any of Clauses 1 to 6, further comprising:
  detecting a defect 156 in the article 102 represented by the metrology data set 104; and
  determining a location 158 of the defect 156 in the build coordinate system 110.

Clause 8. The method 1000 of Clause 7, further comprising:
  obtaining a second metrology data set 136 that represents the article 102 in a second metrology coordinate system 138;
  determining a second surface geometry 140 of the article 102 that is present in the second metrology data set 136 and the build data set 108;
  selecting a second metrology data subset 142 from the second metrology data set 136 that represents the second surface geometry 140 of the article 102;
  selecting a second build data subset 144 from the build data set 108 that represents the second surface geometry 140 of the article 102;
  generating a second metrology point cloud 146 from the second metrology data subset 142 in the second metrology coordinate system 138;
  generating a second build point cloud 148 from the second build data subset 144 in the build coordinate system 110;
  pre-aligning the second metrology point cloud 146 and the second build point cloud 148;
  registering the second metrology point cloud 146 and the second build point cloud 148;
  calculating a second transform 150 between the second metrology coordinate system 138 and the build coordinate system 110; and
  applying the second transform 150 to the second metrology data set 136 to convert the second metrology data set 136 to the build coordinate system 110.

Clause 9. The method 1000 of Clause 8, wherein the metrology data set 104, the build data set 108, and the second metrology data set 136 comprise different types of data.

Clause 10. The method 1000 of Clause 9, wherein:
  the metrology data set 104 comprises a voxel data set 124 from a computed tomography file 126;
  the build data set 108 comprises mesh data set 128 from a build file 130; and
  the metrology data set 104 comprises a second voxel data set 152 from an optical thermography file 154.

Clause 11. The method 1000 of any one of Clauses 8 to 10, further comprising:
  detecting a second defect 160 in the article 102 represented by the second metrology data set 136; and
  determining a second location 162 of the second defect 160 in the build coordinate system 110.

Clause 12. The method 1000 of Clause 11, further comprising applying the transform 122 and the second transform 150 to the metrology data set 104 to convert the metrology data set 104 to the second metrology coordinate system 138.

Clause 13. The method 1000 of Clause 11 or 12, further comprising matching the defect 156 and the second defect 160.

Clause 14. A system 100 comprising:
a computer 164 comprising a processor 166 programmed with instructions 168 that, when executed by the processor 166, causes the computer 164 to:
obtain a metrology data set 104 that represents an article 102 in a metrology coordinate system 106;
obtain a build data set 108 that represents the article 102 in a build coordinate system 110;
determine a surface geometry 112 of the article 102 that is present in the metrology data set 104 and the build data set 108;
select a metrology data subset 114 from the metrology data set 104 that represents the surface geometry 112 of the article 102;
select a build data subset 116 from the build data set 108 that represents the surface geometry 112 of the article 102;
generate a metrology point cloud 118 from the metrology data subset 114 in the metrology coordinate system 106;
generate a build point cloud 120 from the build data subset 116 in the build coordinate system 110;
pre-align the metrology point cloud 118 and the build point cloud 120;
register the metrology point cloud 118 and the build point cloud 120;
calculate a transform 122 between the metrology coordinate system 106 and the build coordinate system 110; and
apply the transform 122 to the metrology data set 104 to convert the metrology data set 104 to the build coordinate system 110.

Clause 15. The system 100 of Clause 14, further comprising a metrology instrument 170 that acquires the metrology data set 104.

Clause 16. The system 100 of Clause 14 or 15, wherein the instructions 168, when executed by the processor 166, further causes the computer 164 to:
detect a defect 156 in the article 102 represented by the metrology data set 104; and
determine a location 158 of the defect 156 in the build coordinate system 110.

Clause 17. The system 100 of any of Clauses 14 to 16, wherein the instructions 168, when executed by the processor 166, further causes the computer 164 to:
obtain a second metrology data set 136 that represents the article 102 in a second metrology coordinate system 138;
determine a second surface geometry 140 of the article 102 that is present in the second metrology data set 136 and the build data set 108;
select a second metrology data subset 142 from the second metrology data set 136 that represents the second surface geometry 140 of the article 102;
select a second build data subset 144 from the build data set 108 that represents the second surface geometry 140 of the article 102;
generate a second metrology point cloud 146 from the second metrology data subset 142 in the second metrology coordinate system 138;
generate a second build point cloud 148 from the second build data subset 144 in the build coordinate system 110;
pre-align the second metrology point cloud 146 and the second build point cloud 148;
register the second metrology point cloud 146 and the second build point cloud 148;
calculate a second transform 150 between the second metrology coordinate system 138 and the build coordinate system 110; and
apply the second transform 150 to the second metrology data set 136 to convert the second metrology data set 136 to the build coordinate system 110.

Clause 18. The system 100 of Clause 17, wherein the instructions 168, when executed by the processor 166, further causes the computer 164 to:
detect a second defect 160 in the article 102 represented by the second metrology data set 136;
determine a second location 162 of the second defect 160 in the build coordinate system 110;
apply the transform 122 and the second transform 150 to the metrology data set 104 to convert the metrology data set 104 to the second metrology coordinate system 138; and
match the defect 156 and the second defect 160.

Clause 19. A computer program product 922 comprising a non-transitory computer-readable medium 920 storing program code 918 that, when executed by a computer 164, causes the computer 164 to perform operations comprising:
obtaining a metrology data set 104 that represents an article 102 in a metrology coordinate system 106;
obtaining a build data set 108 that represents the article 102 in a build coordinate system 110;
determining a surface geometry 112 of the article 102 that is present in the metrology data set 104 and the build data set 108;
selecting a metrology data subset 114 from the metrology data set 104 that represents the surface geometry 112 of the article 102;
selecting a build data subset 116 from the build data set 108 that represents the surface geometry 112 of the article 102;
generating a metrology point cloud 118 from the metrology data subset 114 in the metrology coordinate system 106;
generating a build point cloud 120 from the build data subset 116 in the build coordinate system 110;
pre-aligning the metrology point cloud 118 and the build point cloud 120;
registering the metrology point cloud 118 and the build point cloud 120;
calculating a transform 122 between the metrology coordinate system 106 and the build coordinate system 110; and
applying the transform 122 to the metrology data set 104 to convert the metrology data set 104 to the build coordinate system 110.

Clause 20. The computer program product 922 of Clause 19, wherein the operations further comprise:
detecting a defect 156 in the article 102 represented by the metrology data set 104; and
determining a location 158 of the defect 156 in the build coordinate system 110.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "substantially" refers to a condition that is essentially the stated condition that performs the desired function or achieves the desired result. Further, to the extent that terms "includes," "including," "has," "contains," and variants thereof are used herein, such terms are intended to be inclusive in a manner similar to the term "comprises" as an open transition word without precluding any additional or other elements.

FIGS. 2-6, 8 and 10, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 2-6, 8 and 10, referred to above, need be included in every example and not all elements, features, and/or components described herein are necessarily depicted in each illustrative example. Accordingly, some of the elements, features, and/or components described and illustrated in FIGS. 2-6, 8 and 10 may be combined in various ways without the need to include other features described and illustrated in FIGS. 2-6, 8 and 10, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 2-6, 8 and 10, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 2-6, 8 and 10, and such elements, features, and/or components may not be discussed in detail herein with reference to each of FIGS. 2-6, 8 and 10. Similarly, all elements, features, and/or components may not be labeled in each of FIGS. 2-6, 8 and 10, but reference numerals associated therewith may be utilized herein for consistency.

In FIGS. 1, 7 and 9, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 1, 7 and 9 and the accompanying disclosure describing the operations of the disclosed methods set forth herein should not be interpreted as necessarily determining a sequence in which the operations are to be performed.

Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the method 1000, the method 2000, and the computer program product 922 have been shown and described, modifications may occur to those skilled in the art upon reading the specification. The present application includes such modifications and is limited only by the scope of the claims.

What is claimed is:

1. A computer-implemented method comprising:
    obtaining a metrology data set that represents an article in a metrology coordinate system;
    obtaining a build data set that represents the article in a build coordinate system;
    determining a surface geometry of the article that is present in the metrology data set and the build data set;
    selecting a metrology data subset from the metrology data set that represents the surface geometry of the article;
    selecting a build data subset from the build data set that represents the surface geometry of the article;
    generating a metrology point cloud from the metrology data subset in the metrology coordinate system;
    generating a build point cloud from the build data subset in the build coordinate system;
    pre-aligning the metrology point cloud and the build point cloud;
    registering the metrology point cloud and the build point cloud;
    calculating a transform between the metrology coordinate system and the build coordinate system;
    applying the transform to the metrology data set to convert the metrology data set to the build coordinate system;
    detecting a defect in the article represented by the metrology data set in the metrology coordinate system; and
    determining a location of the defect in the build coordinate system.

2. The method of claim 1, wherein the metrology data set comprises a voxel data set from a computed tomography file.

3. The method of claim 1, wherein the build data set comprises mesh data set from a build file.

4. The method of claim 1, wherein the step of pre-aligning comprises confirming that the metrology point cloud is a subset of the build point cloud.

5. The method of claim 4, wherein the step of pre-aligning comprises aligning an asymmetric physical feature represented in the surface geometry.

6. The method of claim 1, wherein the step of registering comprises executing an iterative closest point algorithm.

7. The method of claim 1, further comprising:
    obtaining a second metrology data set that represents the article in a second metrology coordinate system;
    determining a second surface geometry of the article that is present in the second metrology data set and the build data set;
    selecting a second metrology data subset from the second metrology data set that represents the second surface geometry of the article;
    selecting a second build data subset from the build data set that represents the second surface geometry of the article;
    generating a second metrology point cloud from the second metrology data subset in the second metrology coordinate system;
    generating a second build point cloud from the second build data subset in the build coordinate system;
    pre-aligning the second metrology point cloud and the second build point cloud;
    registering the second metrology point cloud and the second build point cloud;
    calculating a second transform between the second metrology coordinate system and the build coordinate system; and
    applying the second transform to the second metrology data set to convert the second metrology data set to the build coordinate system.

8. The method of claim 7, wherein the metrology data set, the build data set, and the second metrology data set comprise different types of data.

9. The method of claim 7, wherein:
    the metrology data set comprises a voxel data set from a computed tomography file;
    the build data set comprises mesh data set from a build file; and
    the second metrology data set comprises a second voxel data set from an optical thermography file.

10. The method of claim 7, further comprising:
    detecting a second defect in the article represented by the second metrology data set in the second metrology coordinate system; and
    determining a second location of the second defect in the build coordinate system.

11. The method of claim 10, further comprising matching the defect and the second defect.

12. The method of claim 7, further comprising applying the transform and the second transform to the metrology data set to convert the metrology data set to the second metrology coordinate system.

13. A system comprising:
    a computer comprising a processor programmed with instructions that, when executed by the processor, causes the computer to:
        obtain a metrology data set that represents an article in a metrology coordinate system;
        obtain a build data set that represents the article in a build coordinate system;

determine a surface geometry of the article that is present in the metrology data set and the build data set;
select a metrology data subset from the metrology data set that represents the surface geometry of the article;
select a build data subset from the build data set that represents the surface geometry of the article;
generate a metrology point cloud from the metrology data subset in the metrology coordinate system;
generate a build point cloud from the build data subset in the build coordinate system;
pre-align the metrology point cloud and the build point cloud;
register the metrology point cloud and the build point cloud;
calculate a transform between the metrology coordinate system and the build coordinate system; and
apply the transform to the metrology data set to convert the metrology data set to the build coordinate system
detect a defect in the article represented by the metrology data set in the metrology coordinate system; and
determine a location of the defect in the build coordinate system.

14. The system of claim 13, further comprising a metrology instrument that acquires the metrology data set.

15. The system of claim 13, wherein the instructions, when executed by the processor, further causes the computer to:
obtain a second metrology data set that represents the article in a second metrology coordinate system;
determine a second surface geometry of the article that is present in the second metrology data set and the build data set;
select a second metrology data subset from the second metrology data set that represents the second surface geometry of the article;
select a second build data subset from the build data set that represents the second surface geometry of the article;
generate a second metrology point cloud from the second metrology data subset in the second metrology coordinate system;
generate a second build point cloud from the second build data subset in the build coordinate system;
pre-align the second metrology point cloud and the second build point cloud;
register the second metrology point cloud and the second build point cloud;
calculate a second transform between the second metrology coordinate system and the build coordinate system; and
apply the second transform to the second metrology data set to convert the second metrology data set to the build coordinate system.

16. The system of claim 15, wherein the instructions, when executed by the processor, further causes the computer to:
detect a second defect in the article represented by the second metrology data set in the second metrology coordinate system; and
determine a second location of the second defect in the build coordinate system.

17. The system of claim 16, wherein the instructions, when executed by the processor, further causes the computer to match the defect and the second defect.

18. The system of claim 15, wherein the instructions, when executed by the processor, further causes the computer to apply the transform and the second transform to the metrology data set to convert the metrology data set to the second metrology coordinate system.

19. A computer program product comprising a non-transitory computer-readable medium storing program code that, when executed by a computer, causes the computer to perform operations comprising:
obtaining a metrology data set that represents an article in a metrology coordinate system;
obtaining a build data set that represents the article in a build coordinate system;
determining a surface geometry of the article that is present in the metrology data set and the build data set;
selecting a metrology data subset from the metrology data set that represents the surface geometry of the article;
selecting a build data subset from the build data set that represents the surface geometry of the article;
generating a metrology point cloud from the metrology data subset in the metrology coordinate system;
generating a build point cloud from the build data subset in the build coordinate system;
pre-aligning the metrology point cloud and the build point cloud;
registering the metrology point cloud and the build point cloud;
calculating a transform between the metrology coordinate system and the build coordinate system;
applying the transform to the metrology data set to convert the metrology data set to the build coordinate system;
detecting a defect in the article represented by the metrology data set in the metrology coordinate system; and
determining a location of the defect in the build coordinate system.

20. The computer program product of claim 19, wherein the operations further comprise:
obtaining a second metrology data set that represents the article in a second metrology coordinate system;
determining a second surface geometry of the article that is present in the second metrology data set and the build data set;
selecting a second metrology data subset from the second metrology data set that represents the second surface geometry of the article;
selecting a second build data subset from the build data set that represents the second surface geometry of the article;
generating a second metrology point cloud from the second metrology data subset in the second metrology coordinate system;
generating a second build point cloud from the second build data subset in the build coordinate system;
pre-aligning the second metrology point cloud and the second build point cloud;
registering the second metrology point cloud and the second build point cloud;
calculating a second transform between the second metrology coordinate system and the build coordinate system;
applying the second transform to the second metrology data set to convert the second metrology data set to the build coordinate system;
detecting a second defect in the article represented by the second metrology data set in the second metrology coordinate system; and determining a second location of the second defect in at least one of the build coordinate system and the first metrology coordinate system.

\* \* \* \* \*